(12) United States Patent
Tachibana

(10) Patent No.: US 10,277,753 B2
(45) Date of Patent: Apr. 30, 2019

(54) ORIGINAL READING APPARATUS, METHOD FOR CONTROLLING THE SAME, AND STORAGE MEDIUM

(71) Applicant: CANON KABUSHIKI KAISHA, Tokyo (JP)

(72) Inventor: Yoshiro Tachibana, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/823,525

(22) Filed: Nov. 27, 2017

(65) Prior Publication Data
US 2018/0084118 A1   Mar. 22, 2018

Related U.S. Application Data

(63) Continuation of application No. 15/220,105, filed on Jul. 26, 2016, now Pat. No. 9,866,708.

(30) Foreign Application Priority Data

Aug. 5, 2015 (JP) ................. 2015-155394

(51) Int. Cl.
  *H04N 1/00* (2006.01)
  *H04N 1/32* (2006.01)
  *H04N 1/193* (2006.01)

(52) U.S. Cl.
  CPC ..... *H04N 1/00037* (2013.01); *H04N 1/00408* (2013.01); *H04N 1/00602* (2013.01); *H04N 1/193* (2013.01); *H04N 1/3263* (2013.01); *H04N 2201/0081* (2013.01); *H04N 2201/0094* (2013.01)

(58) Field of Classification Search
  CPC .. B65H 1/18; B65H 2511/22; B65H 2515/10; B65H 2555/25; B65H 2601/22; G03G 15/607; H04N 1/00037; H04N 1/00408; H04N 1/00602; H04N 1/193; H04N 1/3263; H04N 2201/0081; H04N 2201/0094
  USPC ............... 358/498, 497, 496; 399/376, 205; 271/153, 152
  See application file for complete search history.

(56) References Cited

U.S. PATENT DOCUMENTS

| 5,087,027 A | 2/1992 | Acquaviva ............... 271/258.04 |
| 5,173,953 A | 12/1992 | Wataya et al. ................. 382/305 |
| 5,383,631 A | 1/1995 | Mazzini ........................ 244/169 |
| 5,541,713 A * | 7/1996 | Takatsuki ............. G03G 15/607 399/206 |
| 5,907,759 A * | 5/1999 | Yashiro .................. G03G 15/60 271/3.06 |
| 6,587,220 B1 * | 7/2003 | Sato .................... H04N 1/00578 347/3 |

(Continued)

FOREIGN PATENT DOCUMENTS

JP   2015-106817   6/2015

*Primary Examiner* — Negussie Worku
(74) *Attorney, Agent, or Firm* — Venable LLP

(57) ABSTRACT

An original reading apparatus conveys an original placed on an original stacking unit, reads the conveyed original, makes a setting about whether to validate a function of interrupting conveyance of originals upon detection of double feed of the originals during conveyance of the originals in accordance with detection of originals stacked on the original stacking unit, detects an original placed on the original stacking unit, and validates the function based on the made setting in accordance with detection of the original by the original detection unit.

15 Claims, 18 Drawing Sheets

(56) References Cited

U.S. PATENT DOCUMENTS

| | | | |
|---|---|---|---|
| 7,753,366 B2* | 7/2010 | Kawanishi | B65H 1/18 |
| | | | 271/152 |
| 7,905,484 B2 | 3/2011 | Komuro | 271/263 |
| 9,088,680 B2* | 7/2015 | Iwayama | H04N 1/00588 |
| 9,487,370 B2* | 11/2016 | Utagawa | B65H 1/14 |
| 9,560,227 B2* | 1/2017 | Kawauchi | H04N 1/0057 |
| 9,665,051 B2 | 5/2017 | Hikichi et al. | G03G 15/502 |
| 9,686,429 B2 | 6/2017 | Tachibana et al. | |
| | | | H04N 1/00641 |
| 9,696,648 B2* | 7/2017 | Maehata | G03G 15/0216 |
| 9,715,354 B2 | 7/2017 | Tachibana | B65H 7/06 |
| 9,866,708 B2* | 1/2018 | Tachibana | H04N 1/00037 |
| 9,938,100 B2* | 4/2018 | Link | B65H 7/06 |
| 9,955,028 B2* | 4/2018 | Ohmi | G06K 9/6212 |
| 10,112,427 B2* | 10/2018 | Iguchi | B41J 2/4753 |
| 10,124,969 B2* | 11/2018 | Yoshiwara | B65H 3/06 |
| 2002/0057917 A1 | 5/2002 | Deen et al. | 399/17 |
| 2006/0115138 A1 | 6/2006 | Klock et al. | 382/135 |
| 2009/0001646 A1* | 1/2009 | Matsumoto | G03G 15/6511 |
| | | | 270/18 |
| 2010/0177349 A1 | 7/2010 | Tarumi | 358/1.15 |
| 2010/0321731 A1* | 12/2010 | Yasui | G03G 15/50 |
| | | | 358/1.15 |
| 2012/0093526 A1* | 4/2012 | Yasui | B41J 3/46 |
| | | | 399/21 |
| 2013/0155448 A1 | 6/2013 | Link et al. | 358/1.15 |
| 2014/0210152 A1* | 7/2014 | Kakuta | B65H 7/20 |
| | | | 271/3.16 |
| 2015/0156357 A1 | 6/2015 | Yabe | 358/498 |
| 2016/0127571 A1* | 5/2016 | Kamisoyama | G06K 9/00469 |
| | | | 358/488 |
| 2016/0255225 A1 | 9/2016 | Yamamoto et al. | |
| | | | B65H 2601/26 |
| 2017/0041477 A1 | 2/2017 | Hirose | H04N 1/121 |
| 2017/0126911 A1 | 5/2017 | Kogi | H04N 1/00037 |
| 2017/0126914 A1* | 5/2017 | Koyanagi | H04N 1/0057 |
| 2018/0007223 A1* | 1/2018 | Hamada | H04N 1/00034 |
| 2018/0041651 A1* | 2/2018 | Nakamura | H04N 1/00588 |

\* cited by examiner

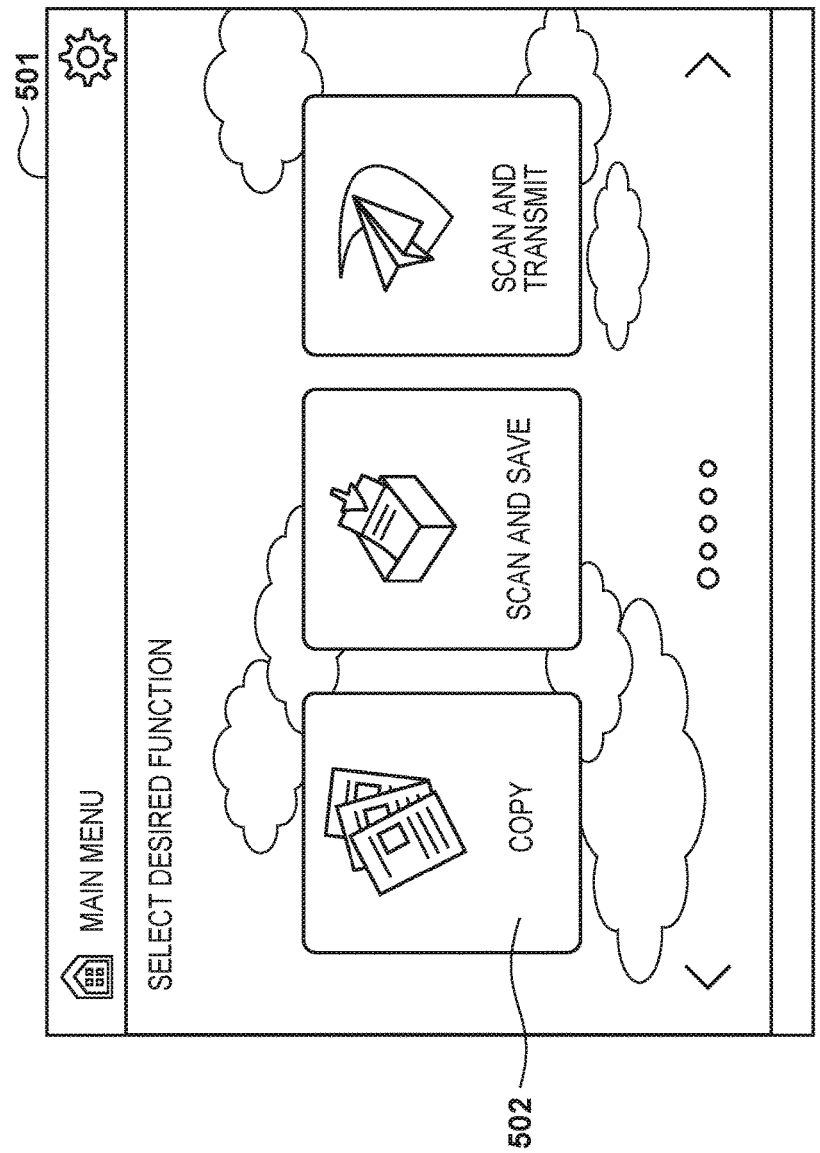

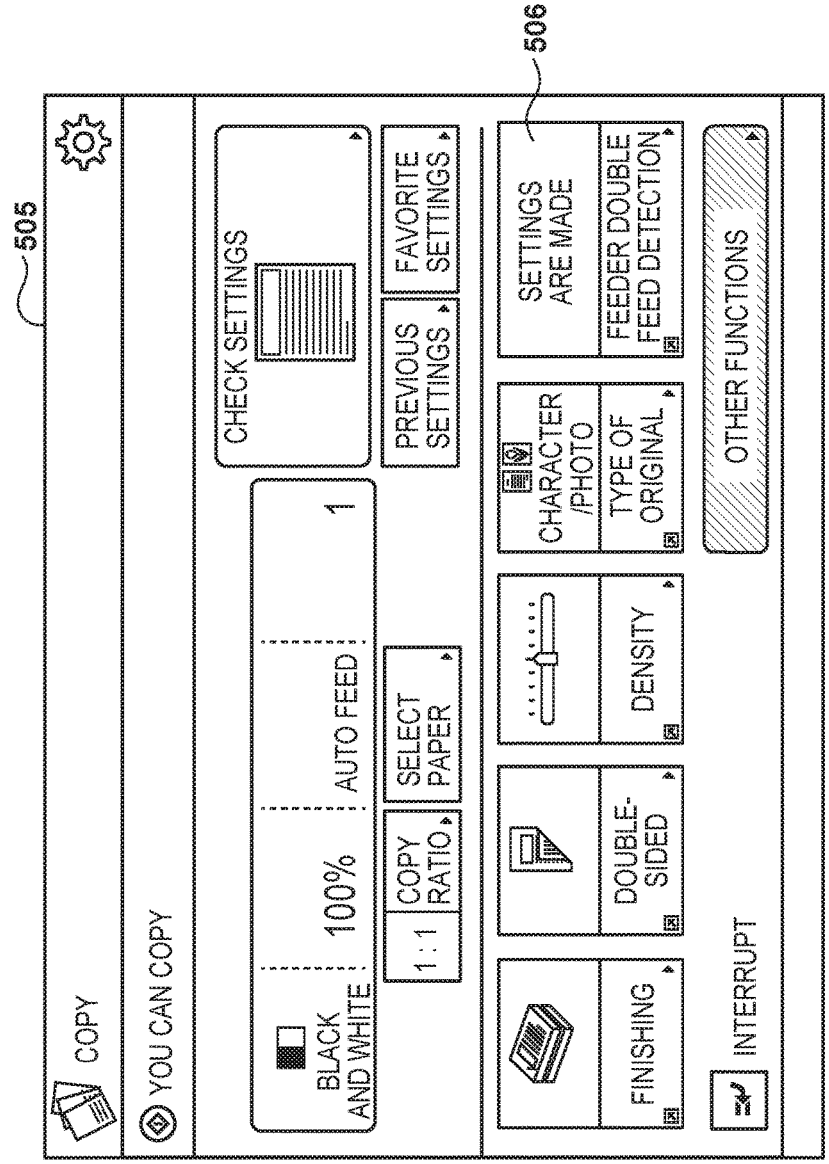

FIG. 6A
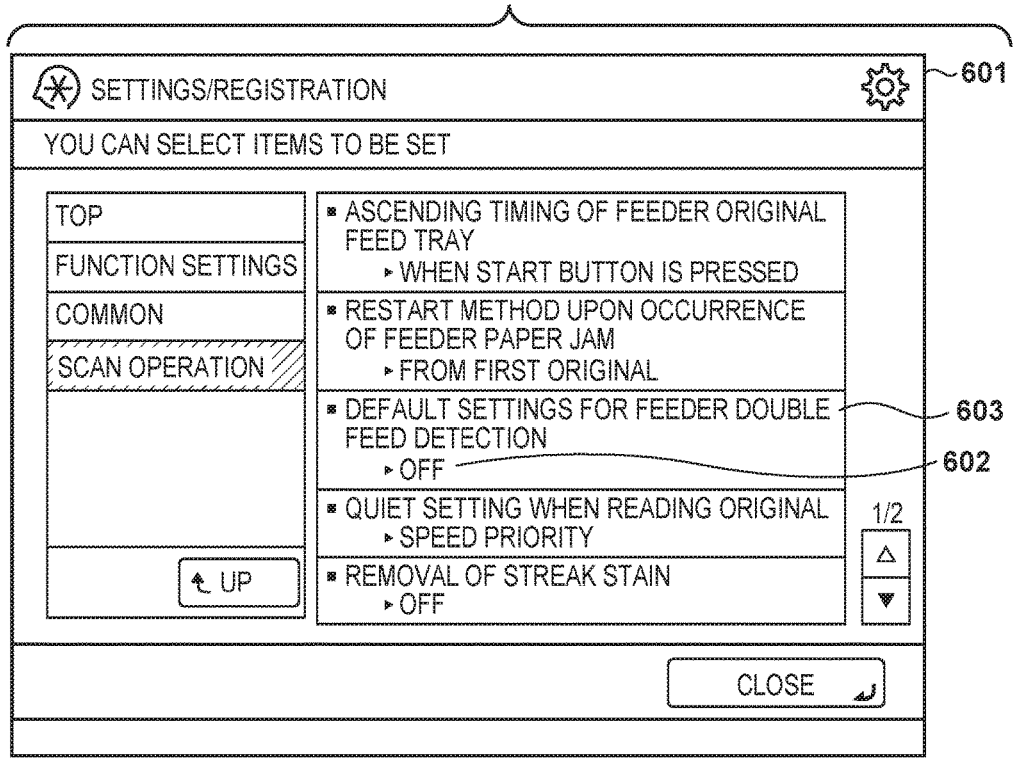
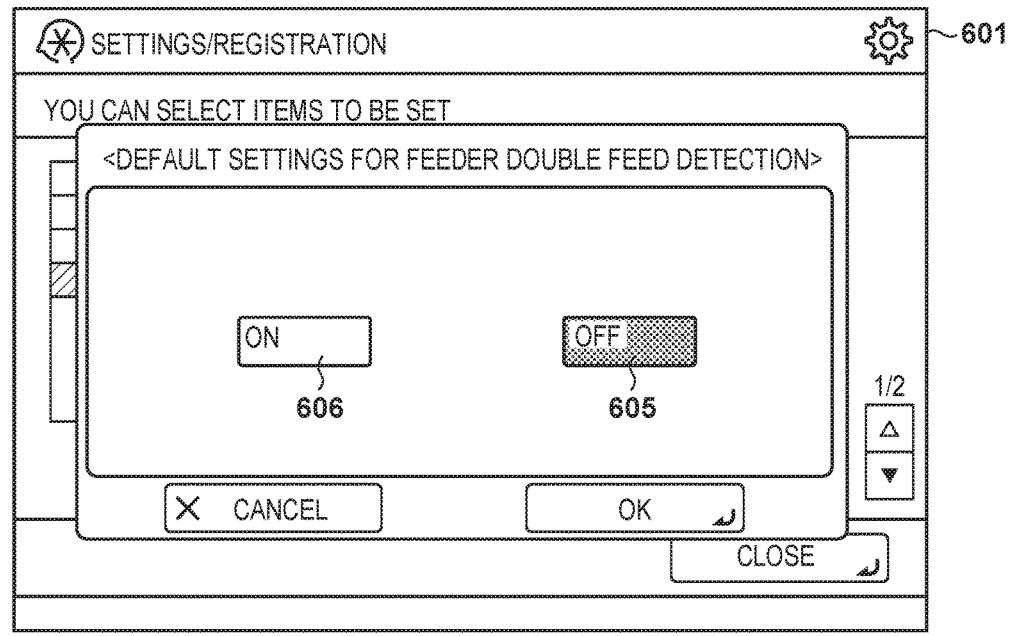
TO FIG.6B

FIG. 6B
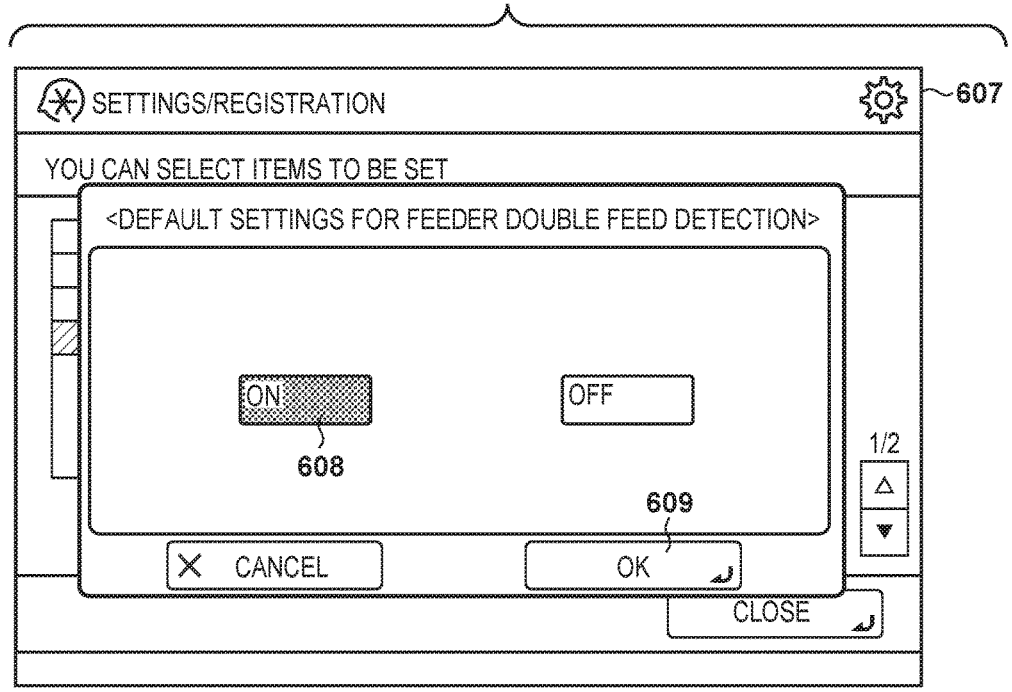
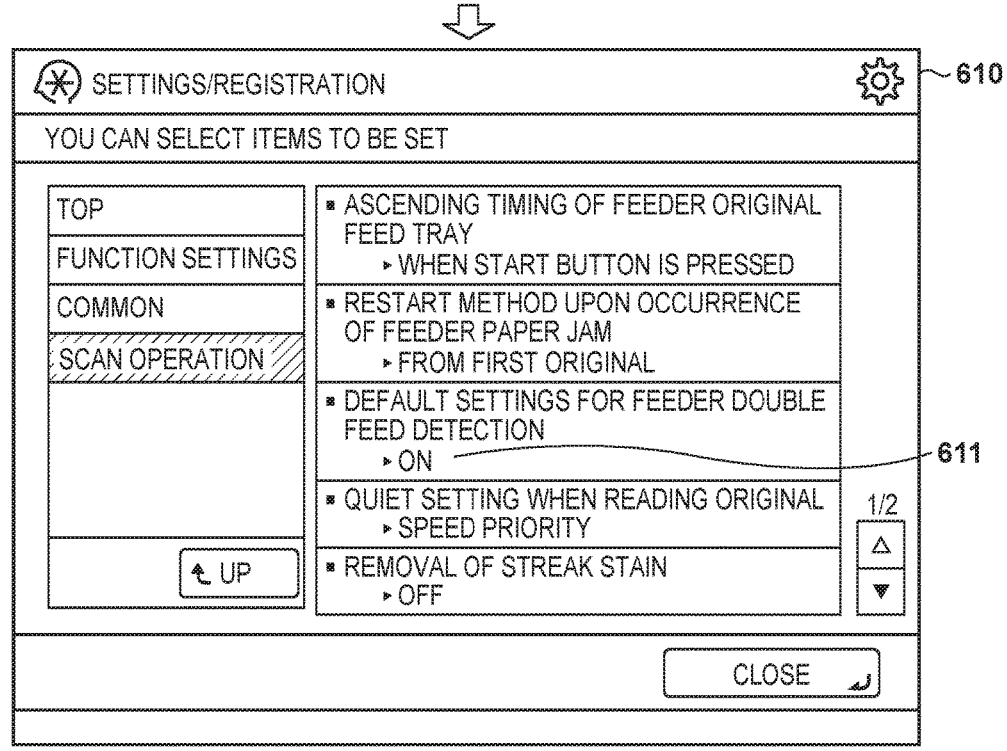

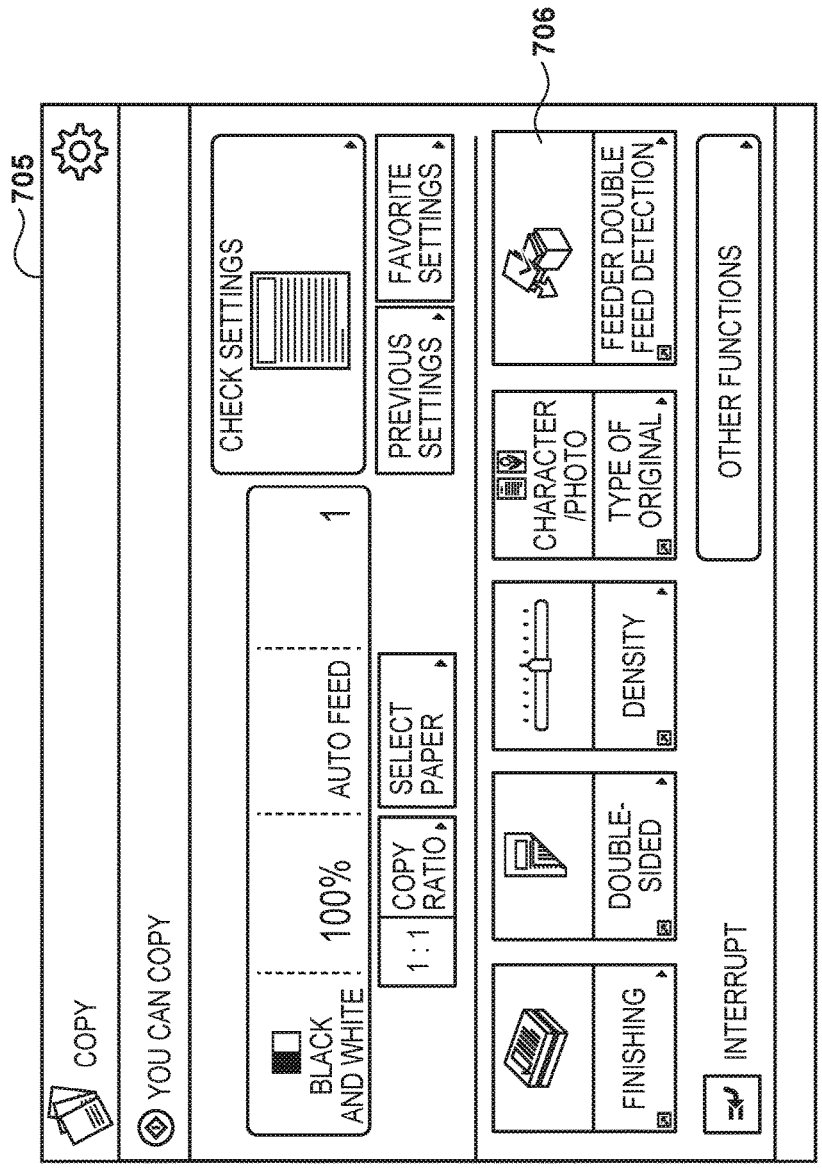

FIG. 8A
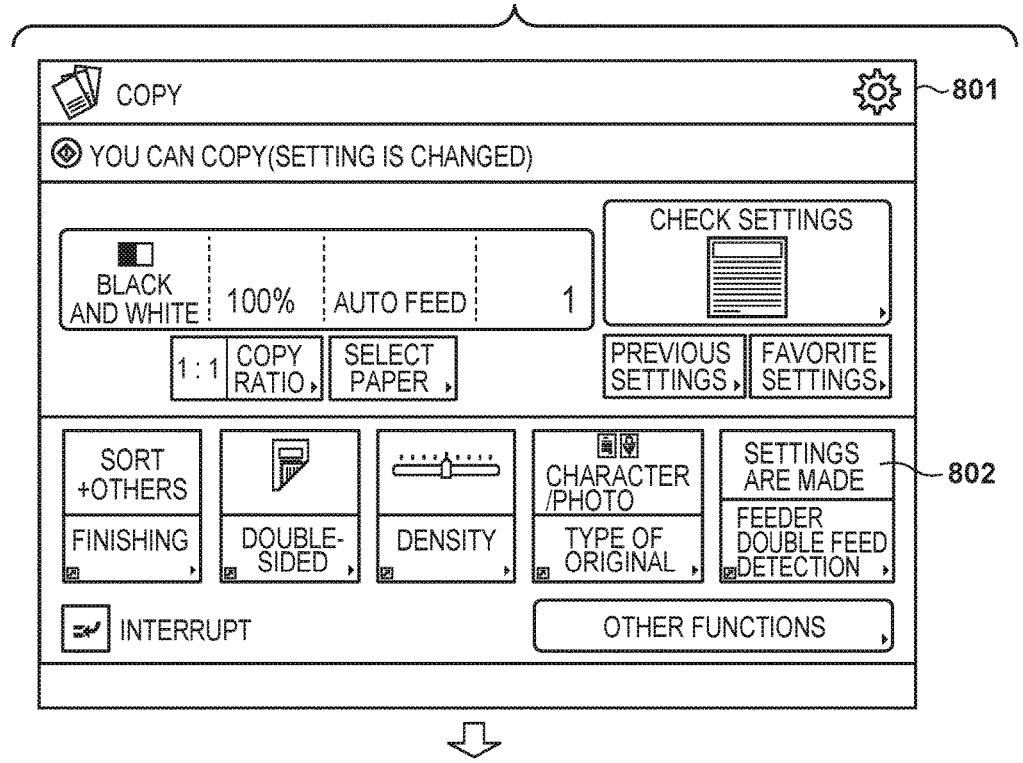
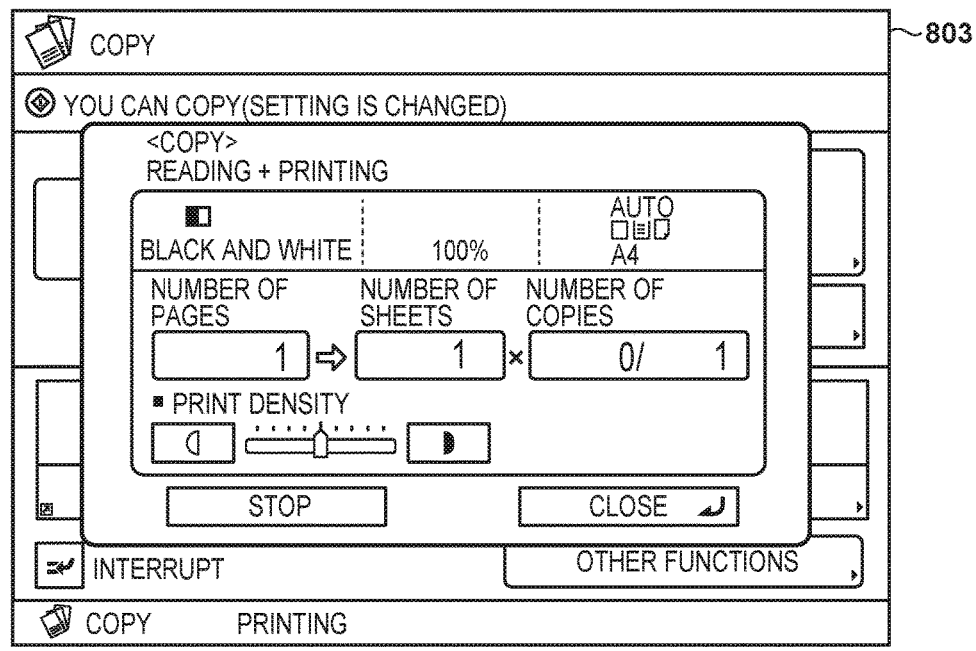
TO FIG.8B

FIG. 8C
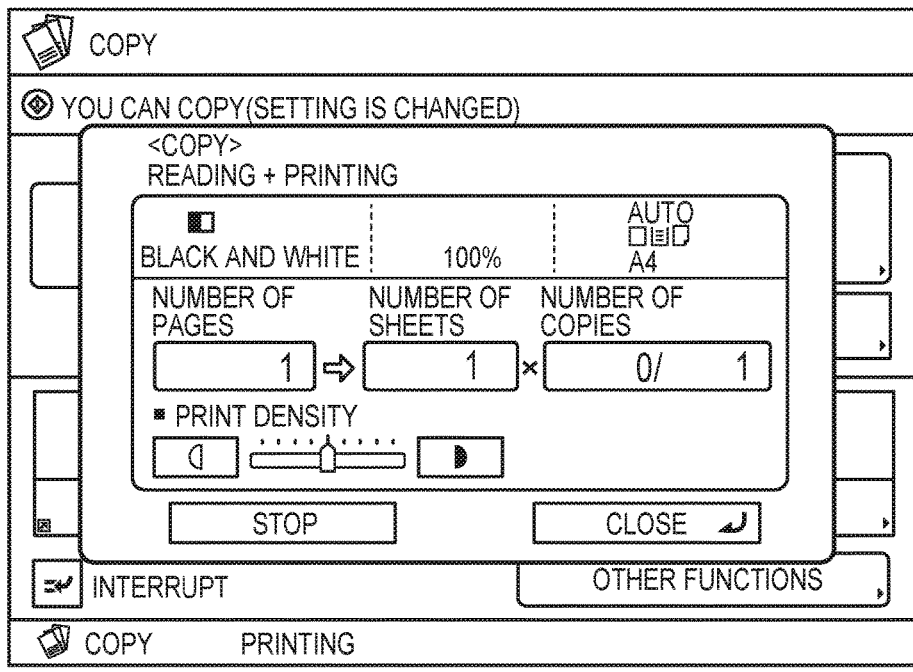
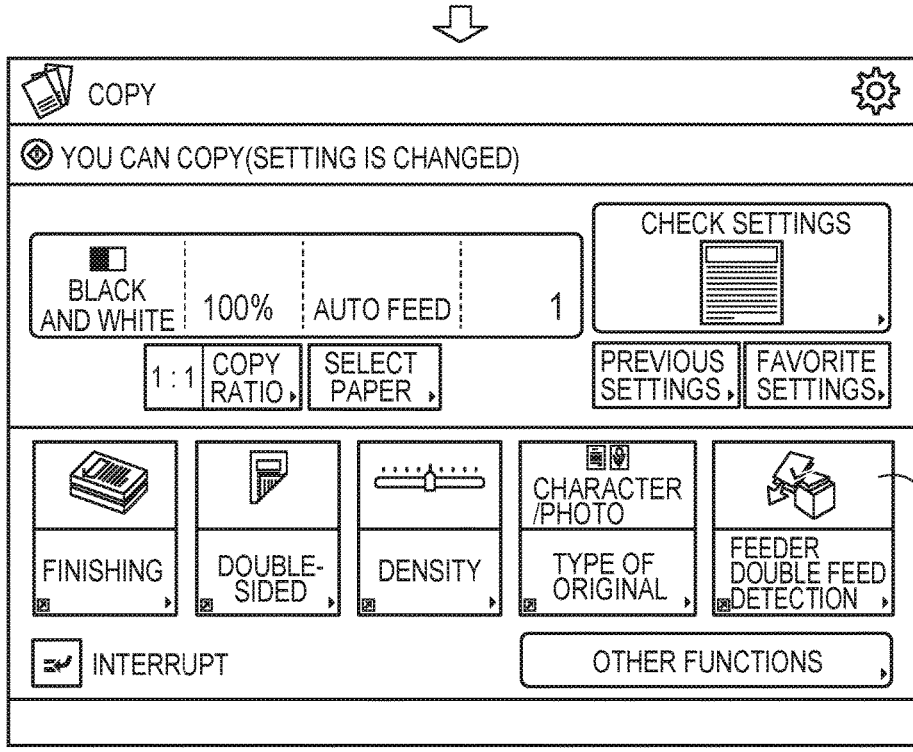

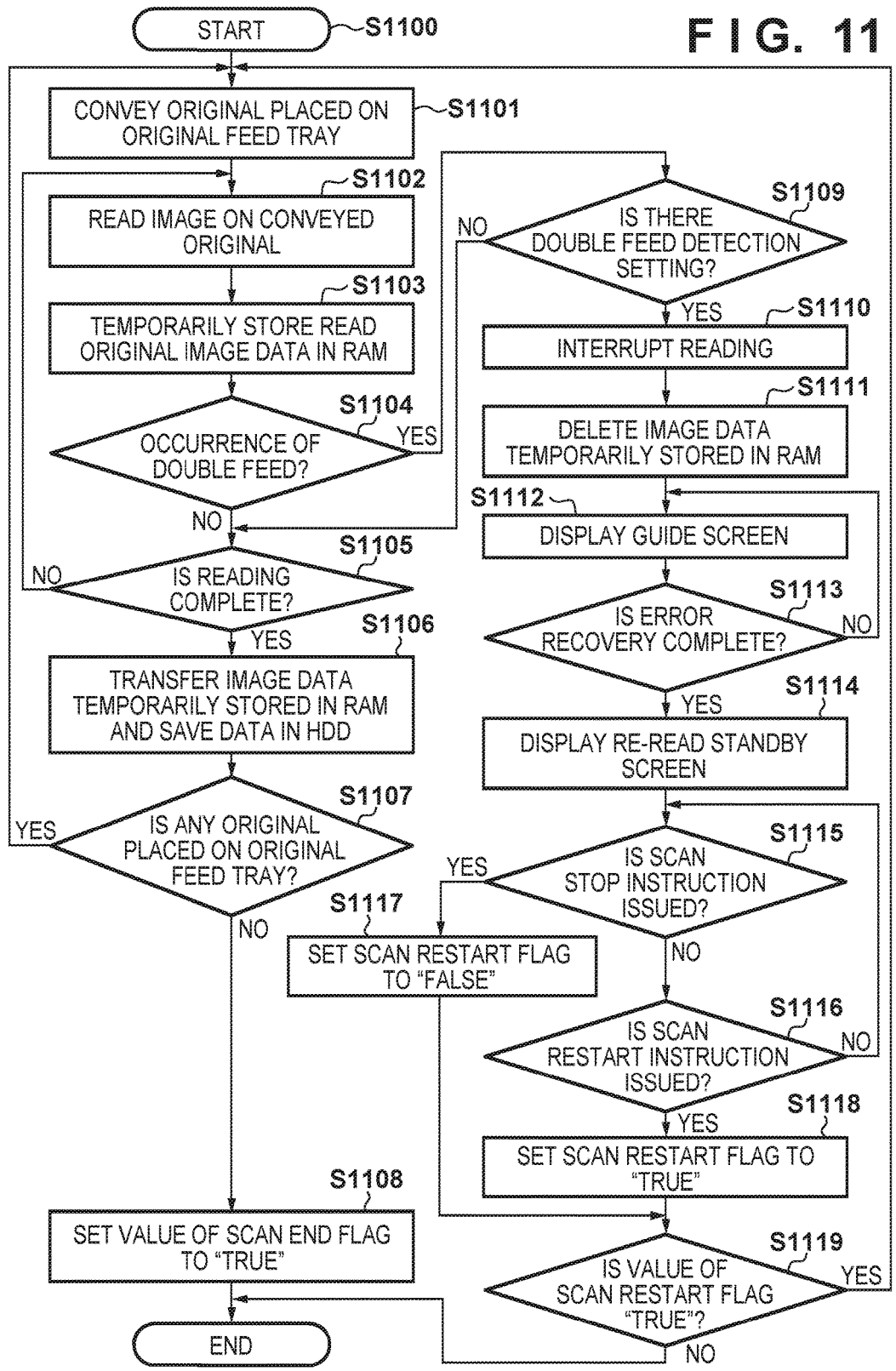

ORIGINAL READING APPARATUS, METHOD FOR CONTROLLING THE SAME, AND STORAGE MEDIUM

This application is a continuation of application Ser. No. 15/220,105 filed Jul. 26, 2016, currently pending; and claims priority under 35 U.S.C. § 119 to Japan Application 2015-155394 filed in Japan on Aug. 5, 2015; and the contents of all of which are incorporated herein by reference as if set forth in full.

BACKGROUND OF THE INVENTION

Field of the Invention

The present invention relates to an original reading apparatus which detects double feed of originals, a method for controlling the same, and a storage medium.

Description of the Related Art

There is available an original reading apparatus which conveys an original from an ADF (Auto Document Feeder) to read an image on the original, and detects the occurrence of double feed of conveyed originals by using a double feed detection sensor such as an ultrasonic sensor. Japanese Patent Laid-Open No. 2015-106817 has proposed an original reading apparatus which makes a setting about whether to stop an original reading operation upon detection of double feed of originals and controls whether to stop an original reading operation or continue the operation without stopping it upon detection of double feed.

The above related art has the following problem. A user who desires to detect double feed of originals wants to automatically validate a function of stopping an original reading operation upon detection of double feed when placing originals on an ADF. However, when executing a job to read originals, such as envelopes, for which it is not necessary to stop a reading operation even upon detection of double feed, it is necessary to temporarily invalidate the double feed detection function with respect to the reading operation of the job.

SUMMARY OF THE INVENTION

The present invention enables realization of a mechanism which detects originals stacked on an original stacking unit and suitably switches a double feed detection function between valid and invalid modes.

One aspect of the present invention provides an original reading apparatus comprising: a conveying unit configured to convey an original placed on an original stacking unit; a reading unit configured to read the original conveyed by the conveying unit; a setting unit configured to make a setting about whether to validate a function of interrupting conveyance of originals upon detection of double feed of the originals during conveyance of the originals by the conveying unit in accordance with detection of originals stacked on the original stacking unit; an original detection unit configured to detect an original placed on the original stacking unit; and a control unit configured to validate the function based on the setting made by the setting unit in accordance with detection of the original by the original detection unit.

Another aspect of the present invention provides a method for controlling an original reading apparatus, the method comprising: conveying an original placed on an original stacking unit; reading the original conveyed in the conveying; making a setting about whether to validate a function of interrupting conveyance of originals upon detection of double feed of the originals during conveyance of the originals in the conveying in accordance with detection of originals stacked on the original stacking unit; detecting an original placed on the original stacking unit; and validating the function based on the setting made in the setting in accordance with detection of the original in the detecting.

Still another aspect of the present invention provides a non-transitory computer-readable storage medium storing a computer program for causing a computer to execute a method for controlling an original reading apparatus, the method comprising: conveying an original placed on an original stacking unit; reading the original conveyed in the conveying; making a setting about whether to validate a function of interrupting conveyance of originals upon detection of double feed of the originals during conveyance of the originals in the conveying in accordance with detection of originals stacked on the original stacking unit; detecting an original placed on the original stacking unit; and validating the function based on the setting made in the setting in accordance with detection of the original in the detecting.

Further features of the present invention will be apparent from the following description of exemplary embodiments with reference to the attached drawings.

BRIEF DESCRIPTION OF THE DRAWINGS

FIGS. 5A-5C are views showing an operation screen displayed on a panel 401;

FIGS. 6A and 6B are views showing an operation screen displayed on the panel 401;

FIGS. 7A-7C are views showing an operation screen displayed on the panel 401;

FIGS. 8A-8C are views showing an operation screen displayed on the panel 401;

FIG. 11 is a flowchart showing a control method for controlling the execution of copying.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The first embodiment of the present invention will be described below. This embodiment executes a job to read (to be referred to as "scan" hereinafter) reading target originals placed on an ADF. In this case, before executing the job, the user can make a setting about whether to validate or invalidate the double feed detection function as a setting for the job. At this time, it is possible to make a setting about whether to validate the double feed detection function in conjunction with the placing of originals on the ADF. The embodiment is configured to switch operation between interrupting a scan and continuing it during the execution of the job in accordance with a setting for the double feed detection function and the detection of double feed of reading target originals by the double feed detection sensor.

Arrangement of Image Reading Apparatus

Figure 1:
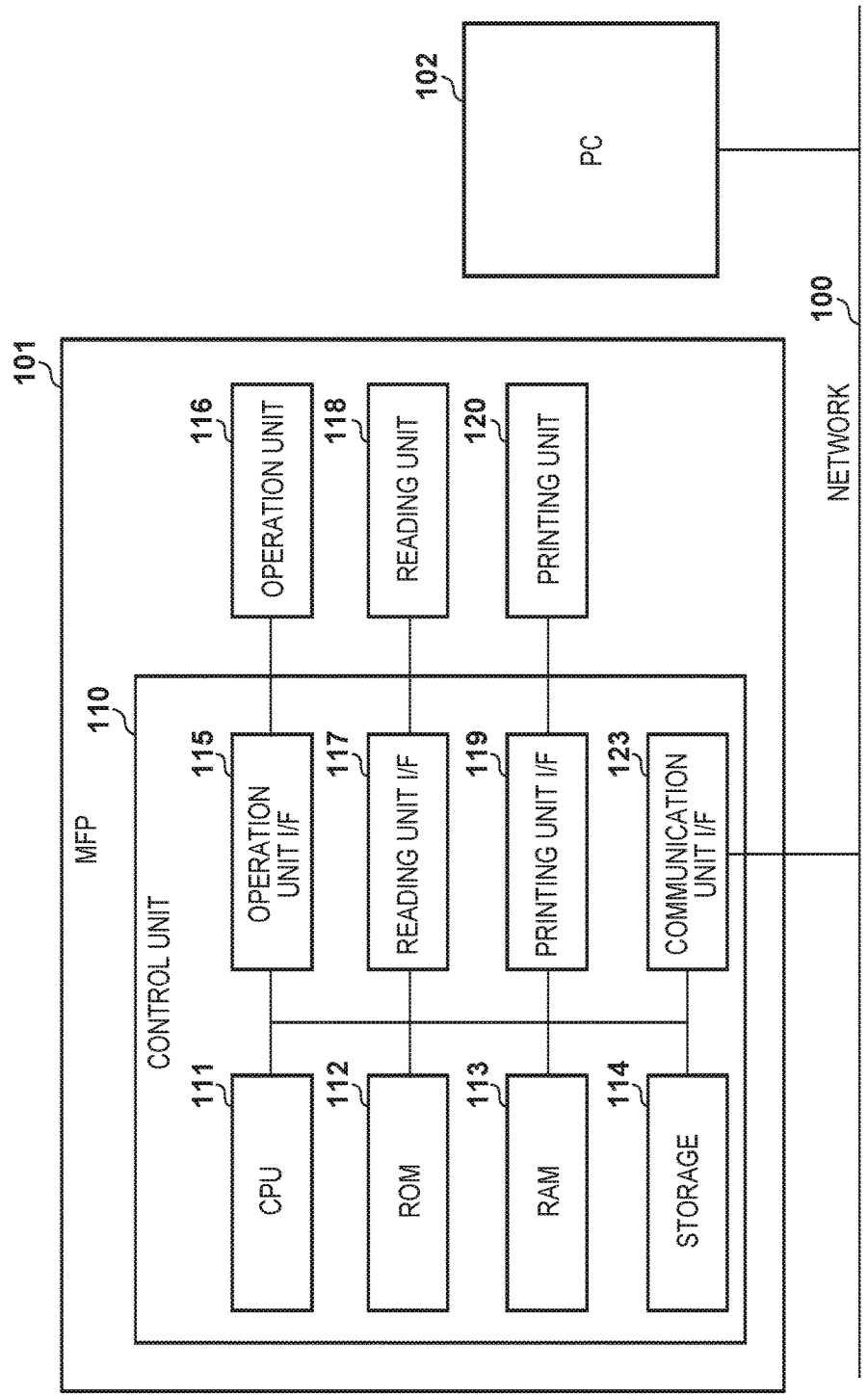
FIG. 1 is a block diagram showing an image reading system.

The arrangement of an image reading apparatus (original reading apparatus) according to this embodiment will be described with reference to FIG. 1. This embodiment will exemplify an MFP (Multi Function Peripheral) 101 as an example of the image reading apparatus.

The MFP 101 has a reading function of reading an image on a sheet and a printing function of printing an image on a sheet. In addition, the MFP 101 has a file transmission function of transmitting image data to an information processing apparatus via a network 100 and a file save function of saving image data in a save area in the MFP 101.

Although this embodiment will exemplify the MFP 101 as an example of the image reading apparatus, this is not exhaustive. The embodiment can be applied to any image reading apparatus configured to convey originals to read images on the originals. More specifically, the image reading apparatus may be a scanner which generates image data from an original and transmits the generated image data to an information processing apparatus such as an external server. In addition, the image reading apparatus may be a scanner which saves data in an external memory (for example, a USB flash drive) detachable from an image reading apparatus via an external bus such as a USB. Assume that in the embodiment, for example, the image reading apparatus includes various types of constituent elements described below.

The MFP 101 includes a control unit 110, an operation unit 116, a reading unit 118, and a printing unit 120. In addition, the control unit 110 includes a CPU 111, a ROM 112, a RAM 113, a storage 114, an operation unit I/F 115, a reading unit I/F 117, a printing unit I/F 119, and a communication unit I/F 123.

The control unit 110 including the CPU 111 comprehensively controls the overall operation of the MFP 101. The CPU 111 reads out control programs stored in the ROM 112 or the storage 114 and performs various types of control such as read control and print control. The ROM 112 stores control programs which can be executed by the CPU 111. The RAM 113 is the main memory of the CPU 111, and is used as a work area or a temporal storage area into which various types of control programs stored in the ROM 112 and the storage 114 are loaded. The storage 114 stores print data, image data, various types of programs, and various types of setting information. In this embodiment, an auxiliary storage device such as an HDD is assumed to be used as the storage 114. However, a nonvolatile memory such as an SSD may be used instead of an HDD.

Note that the MFP 101 according to this embodiment executes each type of processing shown in flowcharts (to be described later) by using one memory (RAM 113) of one CPU 111. However, the embodiment may have another form. For example, each type of processing shown in flowcharts (to be described later) can be executed by cooperative operation between pluralities of CPUs, RAMS, ROMs, and storages. In addition, some processing may be executed by using a hardware circuit such as an ASIC or FPGA.

Figure 4:
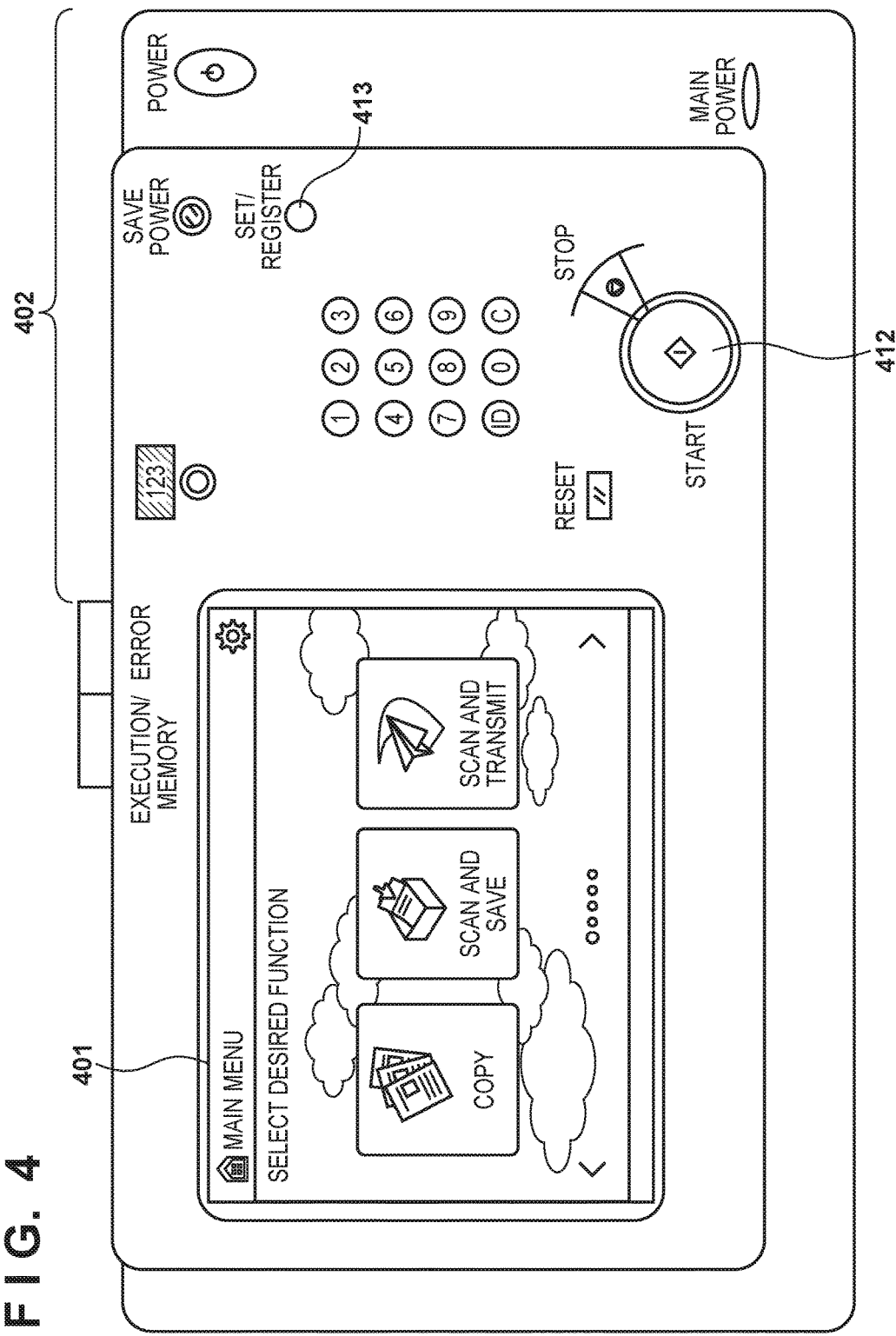
FIG. 4 is a view showing the outer appearance of an operation unit.

The operation unit I/F 115 connects the operation unit 116 to the control unit 110. FIG. 4 shows an external view of the operation unit 116. The operation unit 116 includes a panel 401 for displaying an operation screen and a hard key input unit 402. The panel 401 is, for example, a touch panel display. The hard key input unit 402 includes various types of hard keys such as a start key 412 and a setting/registration key 413. The user inputs an instruction by touching keys displayed on the panel 401 or pressing various types of hard keys of the hard key input unit 402. Note that the panel 401 may be a display having no touch panel function. In this case, the hard key input unit may include a scroll key for selecting keys displayed on the display and a decision key for deciding the keys instead of performing a key input operation by a touch operation. The operation unit 116 functions as a reception unit for receiving instructions issued by the user via the panel 401 and the hard key input unit 402 and functions as a display unit for displaying an operation screen on the panel 401 as needed.

The reading unit I/F 117 connects the reading unit 118 to the control unit 110. The reading unit 118 reads an image on a sheet (original) to generate image data. The image data generated by the reading unit 118 is transmitted to a PC 102 via the network 100 or printed on a sheet. The specific arrangement of the reading unit 118 will be described later with reference to FIGS. 2 and 3.

The printing unit I/F 119 connects the printing unit 120 to the control unit 110. The control unit 110 transfers image data to be printed to the printing unit 120 via the printing unit I/F 119. The printing unit 120 receives a control command and the image data to be printed via the control unit 110, and prints an image based on the image data on a sheet. The printing scheme of the printing unit 120 may be an electrophotographic scheme or inkjet scheme. The printing scheme may be another method (for example, a thermal transfer scheme) as long as it can print an image on a sheet.

In addition, the control unit 110 is connected to the network 100 via the communication unit I/F 123. The communication unit I/F 123 transmits image data and information to the PC 102 on the network 100 or receives print data and information from the PC 102 on the network 100.

The PC 102 can execute various types of programs such as application programs. In addition, a scanner driver and a scan application are installed in the PC 102. The scanner driver enables the PC 102 to use the reading function of the MFP 101. The scan application is used to process and organize scanned images. Issuing a scan instruction from the PC 102 to the MFP 101 allows the use of the reading function of the MFP 101.

Arrangement of Reading Unit

Figure 2:
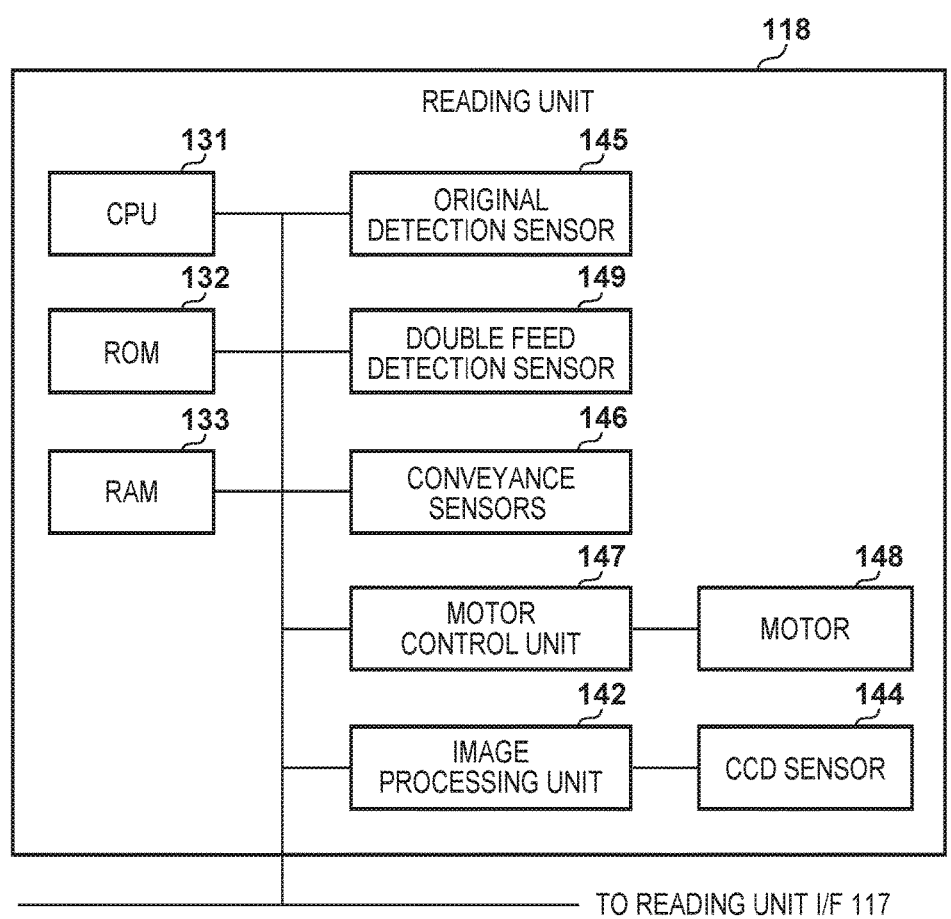
FIG. 2 is a block diagram showing an arrangement associated with control of a reading unit.
Figure 3:
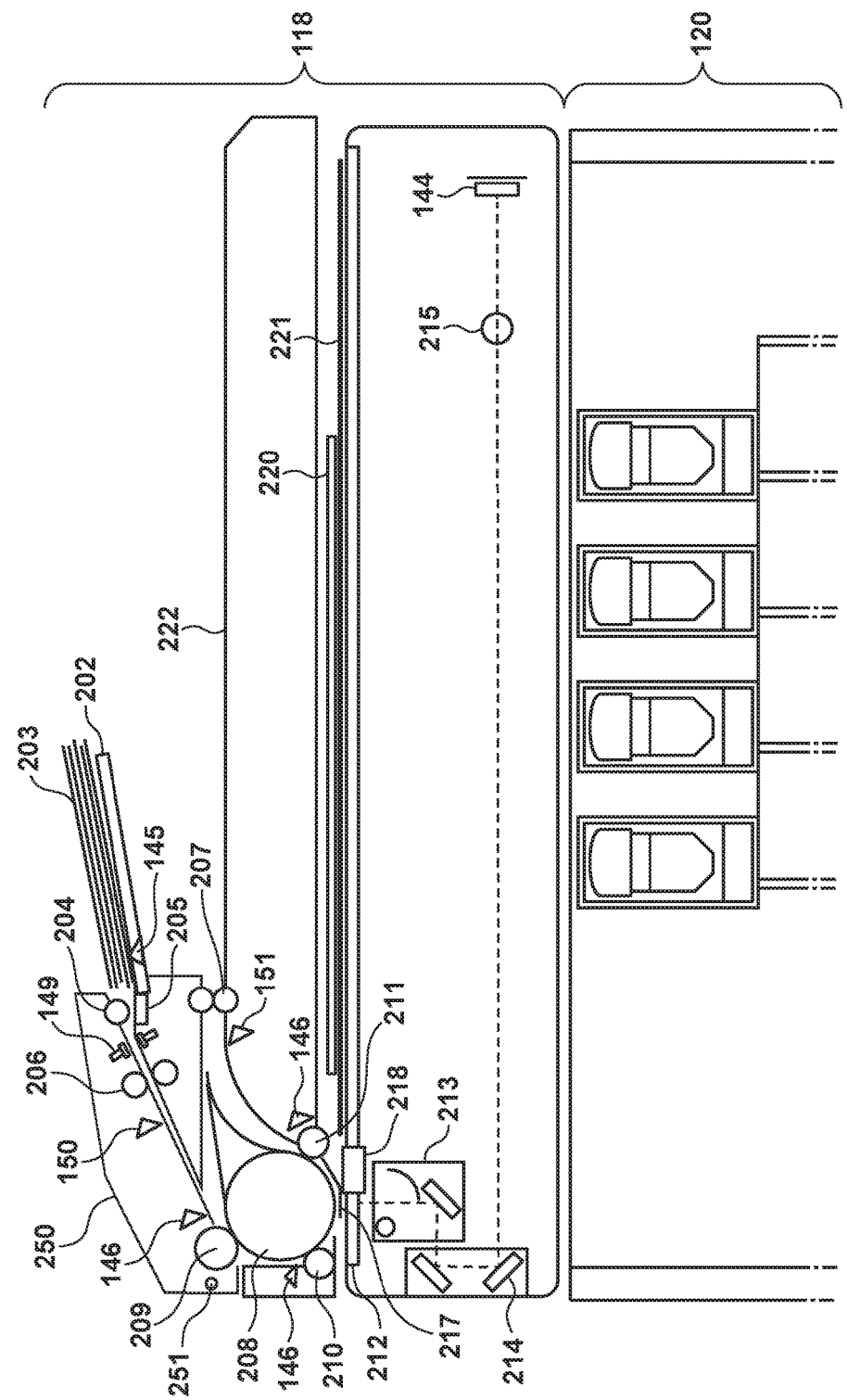
FIG. 3 is a sectional view of the reading unit.

The hardware arrangement of the reading unit 118 included in the MFP 101 will be described next with reference to FIGS. 2 and 3. FIG. 2 shows an arrangement associated with control of the reading unit 118. A CPU 131 controls the operation of the reading unit 118. The CPU 131 reads out control programs stored in a ROM 132, and performs various types of control operations such as read control and communication with the control unit 110. The ROM 132 stores control programs which can be executed by the CPU 131. A RAM 133 is the main memory of the CPU 131, and is used as a work area or a temporal storage area into which various types of control programs stored in the ROM 132 are loaded. Note that the CPU 131, the ROM 132, and the RAM 133 may be implemented by a microcontroller having the same functions integrated in one integrated circuit.

The reading unit 118 further includes an image processing unit 142, a CCD (Charge Coupled Device) sensor 144, an original detection sensor 145, a motor control unit 147, a motor 148, a double feed detection sensor 149, and other conveyance sensors 146. In addition, the reading unit 118 is connected to the control unit 110 via the reading unit I/F 117.

The original detection sensor 145 detects that originals 203 are stacked on an original stacking unit (original feed tray) 202 (to be described later) of the reading unit 118. Note that a detection signal obtained by the original detection sensor 145 is transmitted to the CPU 111 via the reading unit I/F 117.

The motor 148 is driven to rotate an original feed roller 204, convey rollers 206, a large roller 208, a roller 209, a roller 210, a roller 211, and an original delivery roller pair 207 (which will be described later) of the reading unit 118. In addition, the motor 148 is driven to move an exposure unit 213 and a mirror unit 214 (which will be described later) of the reading unit 118. Note that in this embodiment, the CPU 111 controls the driving of the motor 148 by controlling the motor control unit 147. However, this is not exhaustive. The CPU 131 of the reading unit 118 may control the driving of the motor 148 by controlling the motor control unit 147.

The double feed detection sensor 149 detects the occurrence of double feed during the conveyance of originals. Note that the detection signal obtained by the double feed detection sensor 149 is transmitted to the CPU 111 via the reading unit I/F 117. The double feed detection sensor 149 will be described in detail later with reference to FIG. 3. The conveyance sensors 146 are a plurality of sensors provided at proper positions on the convey path of originals, and detect the occurrence of jam and the presence/absence of an original. An A/D conversion unit converts data read by the CCD sensor 144 from an analog signal into a digital signal. Thereafter, the image processing unit 142 converts the digital signal into image data, which is temporarily stored in the RAM 113 via the reading unit I/F 117. The image data is saved in the storage 114 under the control of the CPU 111.

A case in which the reading unit 118 reads images on the originals 203 by using the ADF will be described next with reference to FIG. 3. When the original detection sensor 145 detects that the original 203 is stacked on the stacking unit 202, scanning is started in accordance with the reception of a scan execution instruction from the user.

The originals 203 stacked on the stacking unit 202 are conveyed one by one by a pair of the original feed roller 204 and a separation pad 205. The originals 203 conveyed one by one pass through the double feed detection sensor 149. The double feed detection sensor 149 detects the occurrence of double feed of the conveyed originals 203. In this case, double feed is a state in which when originals are conveyed, two or more originals are conveyed while at least partly overlapping. For example, the double feed detection sensor 149 using ultrasonic waves transmits ultrasonic waves from the upper sensor, and detects a change with the lower sensor, thereby detecting double feed. When the reception intensity of an actually detected signal is lower than the reception intensity of a signal detected at the time of the conveyance of the single original 203 as a reference, the double feed detection sensor 149 determines the occurrence of double feed.

Note that this embodiment will exemplify a sensor using ultrasonic waves as the double feed detection sensor 149. However, it is possible to use an optical sensor as long as it can detect double feed. Alternatively, it is possible to determine the occurrence of double feed of the originals 203 with reference to measurement data obtained by measuring the thickness of the original 203.

The original 203 passing through the double feed detection sensor 149 is fed into the apparatus by the convey rollers 206. An original passage detection sensor 150 as one of the conveyance sensors 146 detects the original 203 conveyed by the convey rollers 206. The original passage detection sensor 150 then determines, based on the detection time, whether the first original 203 has passed. The large roller 208 and the roller 209 convey the original 203 fed into the apparatus by the convey rollers 206. The large roller 208 and the roller 210 further convey the original 203. The large roller 208 and the roller 211 further convey the original 203 after it is conveyed between the large roller 208 and an original guide plate 217 while being in contact with an original glass 212 and passes through a jump ramp 218. The original delivery roller pair 207 delivers the original 203 onto a delivery tray 222. Assume that the CPU 111 rotates the respective rollers by driving the motor 148 to convey the original 203. In addition, a delivery sensor 151 as one of the conveyance sensors 146 detects the delivery of an original onto the delivery tray 222.

When the original 203 passes on the original glass 212, the exposure unit 213 exposes a surface of the original 203 which is in contact with the original glass 212 to light, thereby reading an image on the original 203 in the main scanning direction and the sub-scanning direction. The resultant reflected light from the original 203 is transmitted to the mirror unit 214 via a plurality of mirrors. The transmitted reflected light passes through a lens 215 and is focused. The CCD sensor 144 then converts the light into electrical signal data. The image processing unit 142 converts the data output from the CCD sensor 144 into image data, and transfers it to the control unit 110.

Note that this embodiment has exemplified the optical system of the reading unit 118 as a reduction optical system, which forms reflected light from the original 203 into an image on the CCD sensor 144. However, this is not exhaustive. The optical system of the reading unit 118 may be a 1:1 optical system which forms reflected light from the original 203 into an image on a CIS (Contact Image Sensor). Note that the above description has been made on the case in which the reading unit 118 reads the image on the original 203 while the position of the optical system is fixed, and the original 203 is conveyed by the ADF. However, this is not exhaustive. It is possible to read an image on an original 220 by driving the motor 148 to move the optical system while the original 220 is placed on a platen glass 221 (original table), and the position of the original 220 is fixed.

A cover 250 covers part of the convey path of the ADF. The cover 250 is configured to pivot about a fulcrum shaft 251 so as to be openable and closable. The user can open the cover 250 and perform, for example, a jam process, that is, removing an original jammed in the convey path or an original stopping in the convey path. Note that this embodiment may include an opening/closing sensor which detects whether the cover 250 is open or closed.

Double Feed Detection Setting

Figure 5B:
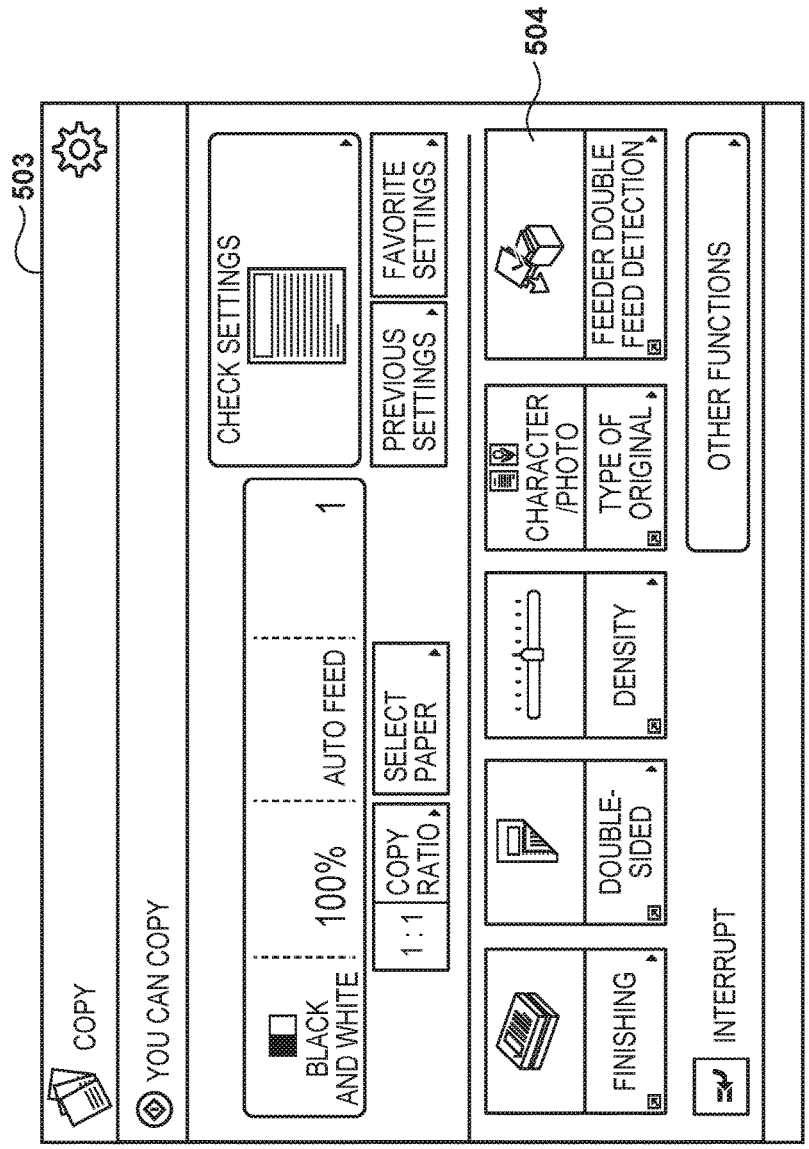

Specific control for making a setting, as a job setting, about whether to validate or invalidate the double feed detection function will be described by taking as an example the copy function of the MFP 101 with reference to FIGS. 5A-5C.

Copy settings will be described first. FIGS. 5A-5C show an example of the transition of a copy screen displayed on the panel 401. A screen 501 is an example of a main menu screen. A screen 503 is an example of a copy setting screen. A screen 505 is another example of the copy setting screen.

When the power of the MFP 101 is turned on to activate the MFP 101, the CPU 111 displays the main menu screen 501 as an initial screen on the panel 401. The user of the MFP 101 can select the copy function from the main menu screen 501 displayed on the panel 401. Assume that buttons (icons) for activating various types of functions (for example, a file save function and a file transmission function) of the MFP 101 are selectably displayed on the main menu screen 501. The CPU 111 displays the copy setting screen 503 in accordance with the pressing of a copy function button 502 by the user while the main menu screen 501 is displayed.

The user can make various copy settings via the copy setting screen 503. For example, the user can make settings such as settings concerning the number of copies and double-sided printing. Note that copy job settings include many setting items which are not exemplarily shown herein. For this reason, it is difficult to make all settings within one screen. Assume therefore that the user makes settings for a plurality of functions by making transition to an individual setting screen for each setting item.

A double feed detection key 504 provided on the copy setting screen 503 is a virtual key for selecting whether to validate or invalidate the double feed detection function. The user can change a setting, as a job setting, about whether to detect the occurrence of double feed using the double feed detection key 504. The copy setting screen 503 in FIG. 5B exemplifies a case in which a setting is made not to detect the occurrence of double feed. If "a setting not to detect the occurrence of double feed" according to this embodiment has been made, the conveyance of an original is not stopped even if the double feed detection sensor 149 detects double feed. Therefore, "a setting not to detect the occurrence of double feed" can be a setting not to stop the conveyance of an original even if the double feed detection sensor 149 detects double feed.

The CPU 111 displays the copy setting screen 505 in accordance with the pressing of the double feed detection key 504 by the user while the copy setting screen 503 is displayed. The copy setting screen 505 exemplifies a case in which a setting is made to detect the occurrence of double feed on the copy setting screen 505. If "a setting to detect the occurrence of double feed" according to this embodiment is made, the conveyance of an original is stopped in accordance with the detection of double feed by the double feed detection sensor 149. Therefore, "a setting to detect the occurrence of double feed" can be a setting to stop the conveyance of an original in accordance with the detection of double feed by the double feed detection sensor 149. In addition, the CPU 111 according to this embodiment performs control to display the double feed detection key in a color different from that of the double feed detection key 504 as indicated by a double feed detection key 506 to notify the user that a setting is made to detect the occurrence of double feed. In this case, display is performed in different colors. However, the present invention is not limited to this. For example, the double feed detection key 506 may be displayed in a shape different from that of the double feed detection key 504. Alternatively, the double feed detection key 504 may be displayed while not blinking, and the double feed detection key 506 may be displayed while blinking.

Original Detection Setting

There follows a description, with reference to FIGS. 6A and 6B, of specific control when registering, as a device setting, a setting whether to switch from a setting not to detect the occurrence of double feed in accordance with the detection of an original to a setting to detect the occurrence of double feed. FIGS. 6A and 6B show an example of the transition of a setting/registration screen displayed on the panel 401. A screen 601 is an example of a setting/registration menu screen. A screen 604 is an example of a setting change screen. A screen 607 is another example of the setting change screen. A screen 610 is another example of the setting/registration menu screen.

The CPU 111 displays the setting/registration menu screen 601 on the panel 401 in accordance with the pressing of the setting/registration key 413 of the hard key input unit 402. The setting/registration menu screen 601 displays the value "OFF" as information 602, which indicates that the user has not made a setting to switch the double feed detection key 504 shown on the copy setting screen 503 to the double feed detection key 506 shown on the copy setting screen 505 when an original is detected. A default setting menu 603 for feeder double feed detection is a menu for transition to the setting change screen.

Upon detecting the pressing of the default setting menu 603 for feeder double feed detection, the CPU 111 displays the setting change screen 604 on the panel 401. The setting change screen 604 displays an OFF key 605 and an ON key 606. In this case, when the OFF key 605 is highlighted, it indicates that there will be no switching from the setting not to detect the occurrence of double feed in accordance with the detection of an original to the setting to detect the occurrence of double feed. That is, the current default setting for feeder double feed detection is OFF.

The CPU 111 displays the setting change screen 607 on the panel 401 in accordance with the pressing of the ON key 606 by the user while the setting change screen 604 is displayed. When an ON key 608 is highlighted on the setting change screen 607, it indicates that switching is made from the setting not to detect the occurrence of double feed in accordance with the detection of an original to the setting to detect the occurrence of double feed.

The CPU 111 displays the setting/registration menu screen 610 on the panel 401 in accordance with the pressing of an OK key 609 by the user (user input) while the setting change screen 607 is displayed. In this case, the CPU 111 sets the value of a flag (to be referred to as an original detection setting flag hereinafter) to "TRUE" (valid). This flag indicates whether to switch from a setting not to cope with double feed when it occurs upon detection of an original to a setting to cope with the occurrence of double feed. Note that the value of the original detection setting flag is temporarily stored in the RAM 113. Note that when the original detection setting flag is "TRUE", it indicates that the double feed detection key 504 displayed on the copy setting screen 503 is switched to the double feed detection key 506 displayed on the copy setting screen 505 when an original is detected. With this setting, when double feed is detected, error processing or the like is performed to eliminate the double feed. This embodiment will exemplify a case in which error processing is performed so as to stop the conveyance of an original. However, error processing may be performed so as to stop an original reading operation while continuing the conveyance of an original. When the original detection setting flag is "FALSE" (invalid), it indicates that when an original is detected, there is no switching from the double feed detection key 504 displayed on the copy setting screen 503 to the double feed detection key 506 displayed on the copy setting screen 505. With this setting, even if double feed is detected, no measure is taken, and the conveyance of the original is continued. The setting/registration menu screen 610 displays the value "ON" as information 611, which indicates that a setting is made to switch from the double feed detection key 504 displayed on the copy setting screen 503 to the double feed detection key 506 displayed on the copy setting screen 505 when an original is detected.

Figure 7A:
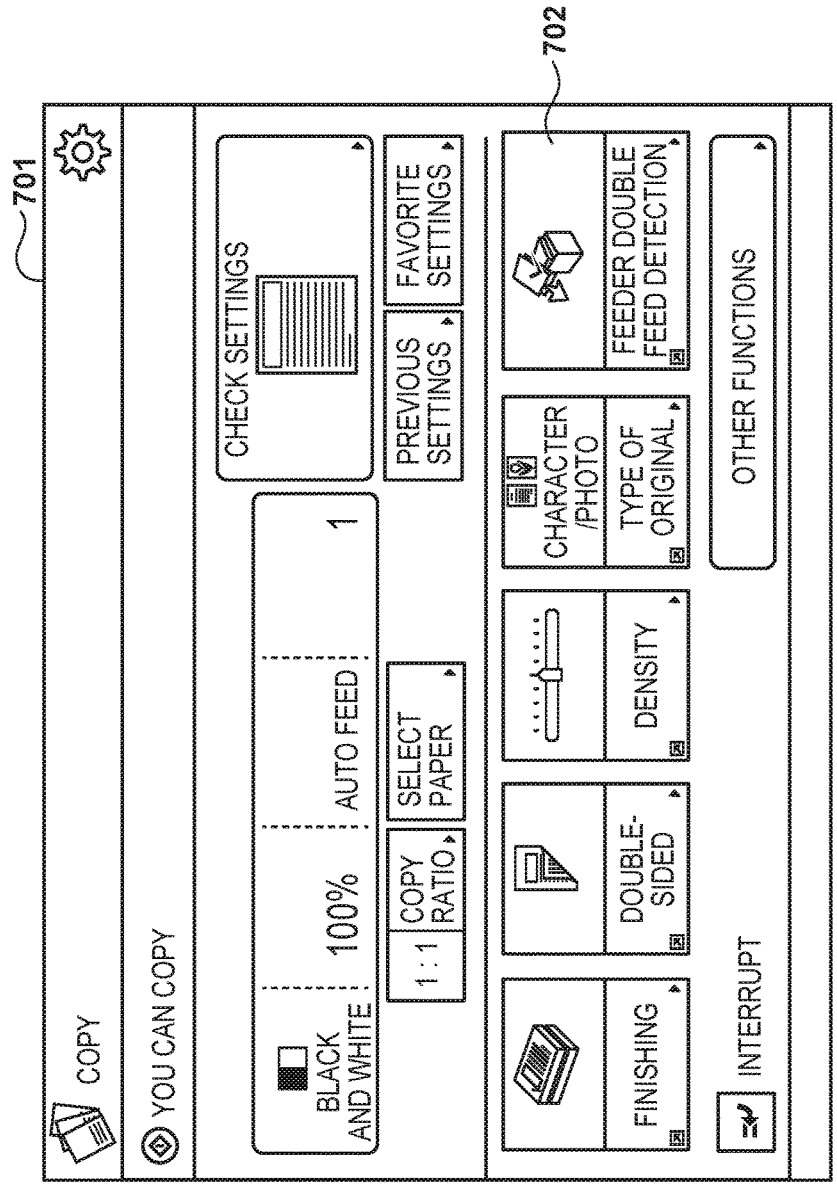
Figure 7B:
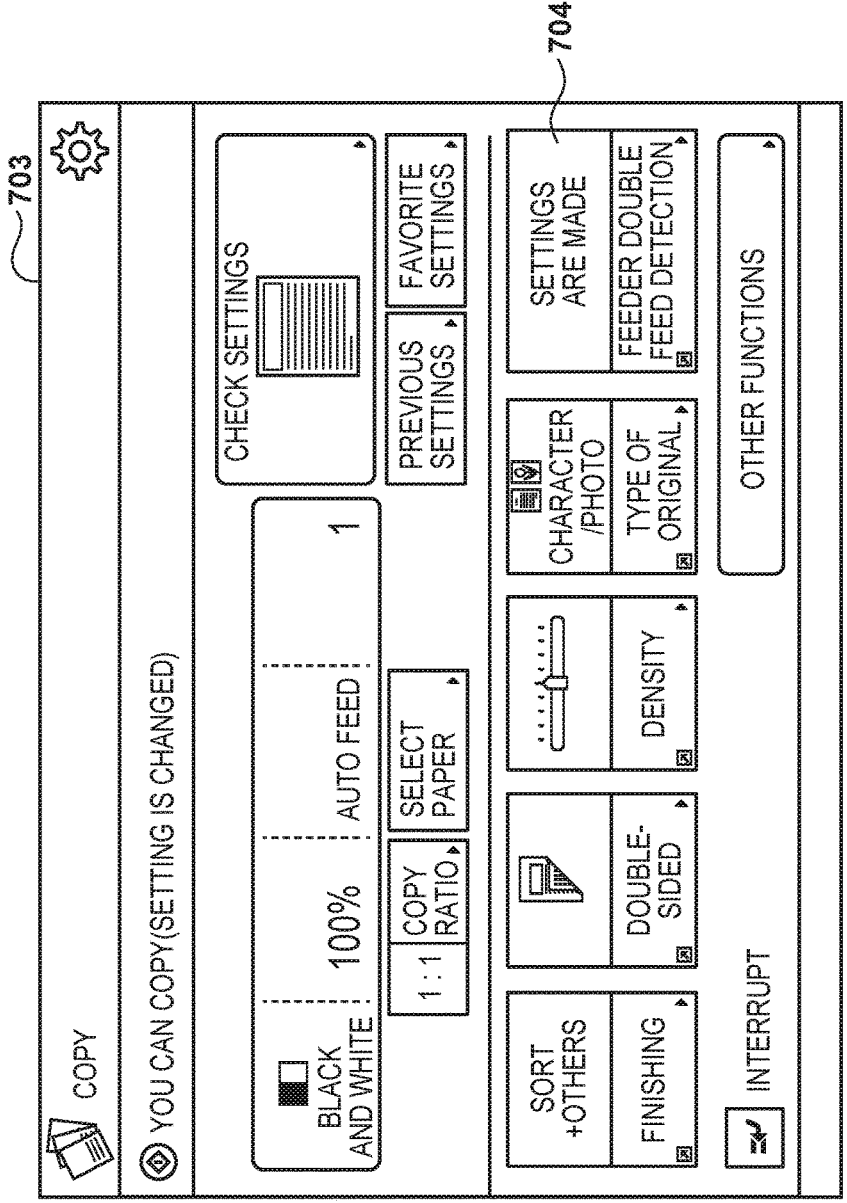

Specific control to be performed when the original detection setting flag is "TRUE" will be described next with reference to FIGS. 7A-7C by exemplifying the copy function of the MFP 101. FIGS. 7A-7C show an example of the transition of a copy screen displayed on the panel 401.

The CPU 111 displays a copy setting screen 701 on the panel 401 in accordance with the pressing of the copy function button 502 displayed on the main menu screen 501 by the user while no original 203 is stacked on the stacking unit 202. The CPU 111 displays a copy setting screen 703 on the panel 401 in accordance with the stacking of the originals 203 on the stacking unit 202 by the user while the copy setting screen 701 is displayed. The copy setting screen 703 exemplifies a case in which a setting is made to detect the occurrence of double feed as indicated by a double feed detection key 704. The double feed detection key 704 is displayed in a color different from that of a double feed detection key 702. In this case, these keys are displayed in different colors. However, the present invention is not limited to this. For example, the double feed detection key 704 may be displayed in a shape different from that of the double feed detection key 702. Alternatively, while the double feed detection key 702 is displayed without blinking, the double feed detection key 704 may be displayed with blinking.

When the user removes the original 203 from the stacking unit 202 while the copy setting screen 703 is displayed, the CPU 111 displays a copy setting screen 705 on the panel 401. The copy setting screen 705 exemplifies a case in which no setting is made to detect the occurrence of double feed as indicated by a double feed detection key 706.

Processing at Time of Detection of Double Feed

Assume that the reading unit 118 of the MFP 101 reads originals. In this case, when double feed occurs, since a plurality of originals in a stacked state flow along the convey path, original jam is likely to occur midway along the path. Even if the originals successfully pass through the convey path, since image data is read while the two originals are stacked on each other, the generated image data lacks in some original information. In this embodiment, therefore, a setting is made, as a job setting, to validate the double feed detection function. In addition, when double feed occurs, control is performed to temporarily stop the conveyance of originals and notify the user of the detection of the double feed.

Figure 8B:
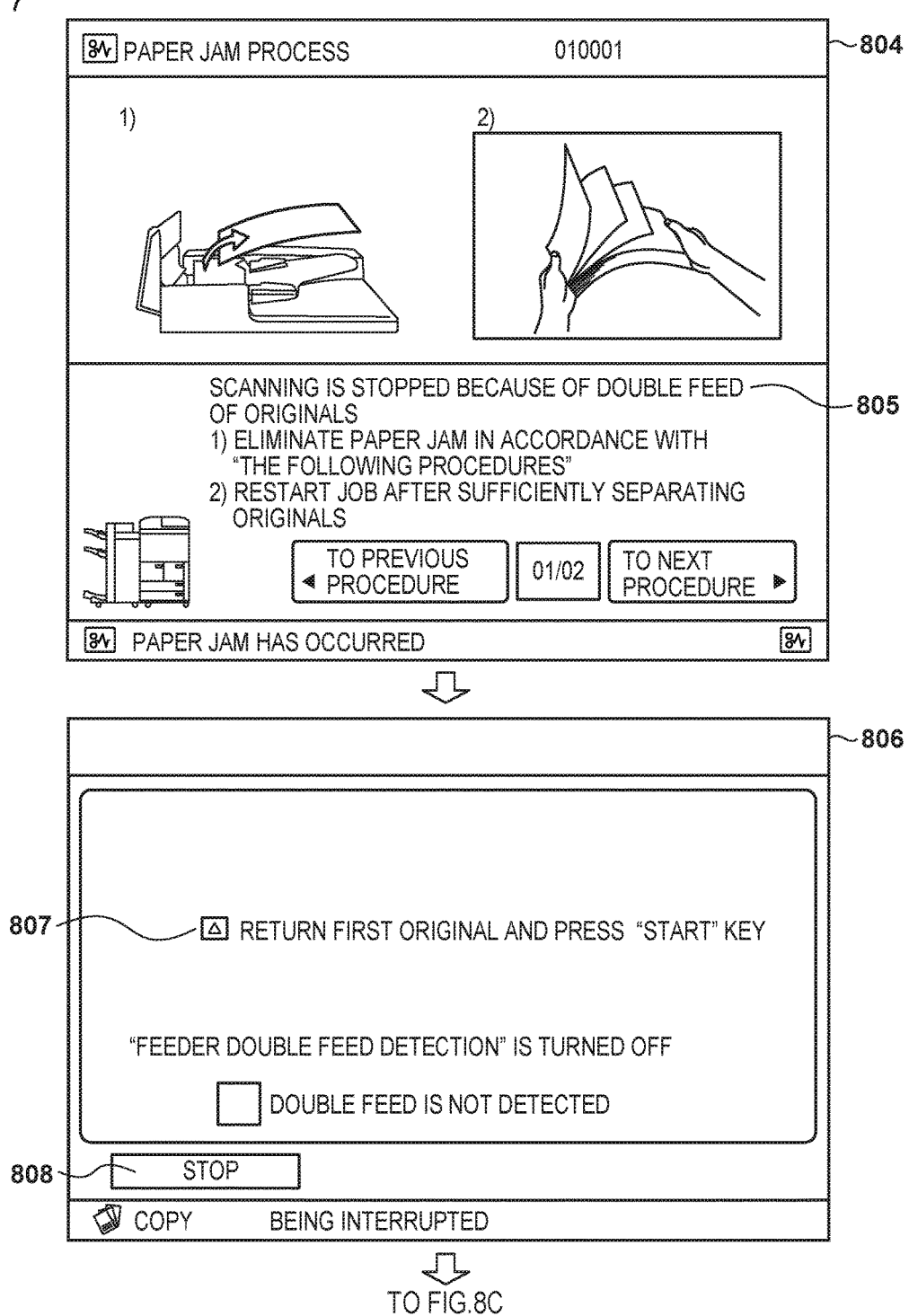

Specific control to be performed until the user completes re-reading of an original after resetting the original on the ADF upon reception of a notification of double feed will be described with reference to FIGS. 8A-8C by exemplifying the copy function of the MFP 101. FIGS. 8A-8C show an example of the transition of a screen displayed on the panel 401 when the double feed detection sensor 149 of the reading unit 118 detects the occurrence of double feed.

A screen 801 is an example of a copy setting screen. A screen 803 is an example of a copy execution screen. A screen 804 is an example of a guide screen for displaying information which notifies the user of the occurrence of double feed. A screen 806 is an example of a screen for waiting for re-reading of an original. A screen 809 is another example of the copy execution screen. A screen 810 is another example of the copy setting screen.

The copy setting screen 801 exemplifies a case in which a setting is made to detect the occurrence of double feed as indicated by a double feed detection key 802. Upon detecting that the start key 412 is pressed while the copy setting screen 801 is displayed, the CPU 111 starts copy processing. The CPU 111 causes the reading unit 118 to start an original reading operation, and displays the copy setting screen 803 on the panel 401.

When the double feed detection sensor 149 detects the occurrence of double feed while an original is read by the copy function, the CPU 111 interrupts the conveyance of the original. Note that instead of interrupting the conveyance of an original, the CPU 111 may perform control to interrupt an original reading operation while continuing the conveyance of the original. In addition, the CPU 111 displays the guide screen 804 on the panel 401. Information 805 is information for notifying the user of the necessity to remove the sheet and the interruption of scanning because of the occurrence of double feed.

Subsequently, upon determining, based on the conveyance sensors 146, the opening/closing sensor, and the like, that error cancellation can be done, the CPU 111 displays the re-read standby screen 806 on the panel 401. Information 807 on the re-read standby screen 806 is information for notifying the user that he/she can restart processing by resetting the original and pressing the start key 412. The user can restart reading the original by pressing the start key 412. Upon detecting that the start key 412 is pressed, the CPU 111 displays the copy execution screen 809 on the panel 401.

In addition, a stop key 808 on the re-read standby screen 806 is a key to be used to stop the copy function under execution. The user can discard the read original and stop processing under execution by pressing the stop key 808. Upon detecting that the stop key 808 is pressed, the CPU 111 displays the copy execution screen 809 on the panel 401.

Upon detecting the end of the copy processing, the CPU 111 displays the copy setting screen 810 on the panel 401. The copy setting screen 810 exemplifies a case in which no setting is made to detect the occurrence of double feed as indicated by a double feed detection key 811.

Processing Procedure

A specific control method for executing a copy job upon reception of a copy job execution instruction will be described as an example of the copy function with reference to the flowcharts shown in FIGS. 9 to 11. The CPU 111 executes each operation (step) in the flowcharts shown FIGS. 9 to 11 by loading control programs stored in the ROM 112 or the storage 114 into the RAM 113 and executing them. Note that another CPU (for example, the CPU 131 of the reading unit 118) may execute some of the control programs which implement the respective operations to implement the operations in cooperation with other control programs.

Figure 9:
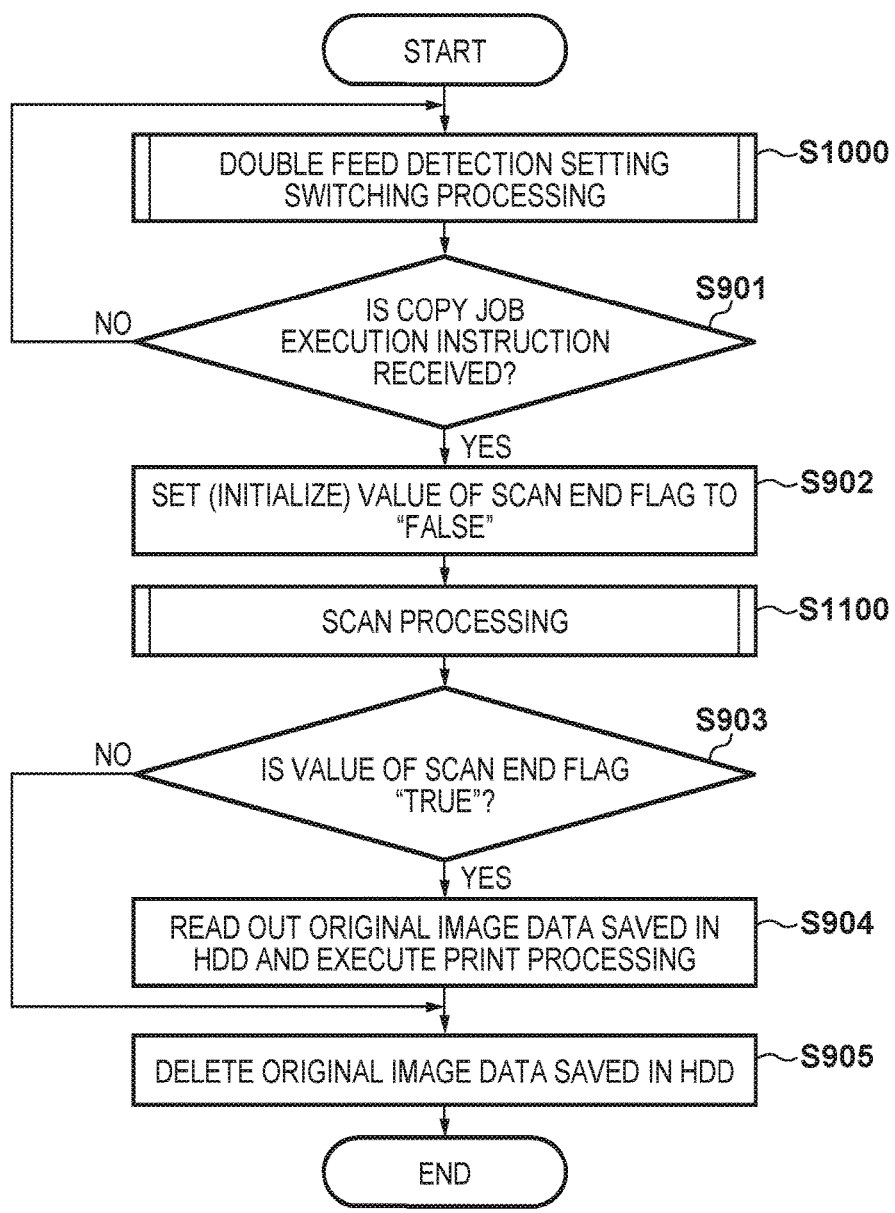
FIG. 9 is a flowchart showing a control method for controlling the execution of copying.
Figure 10:
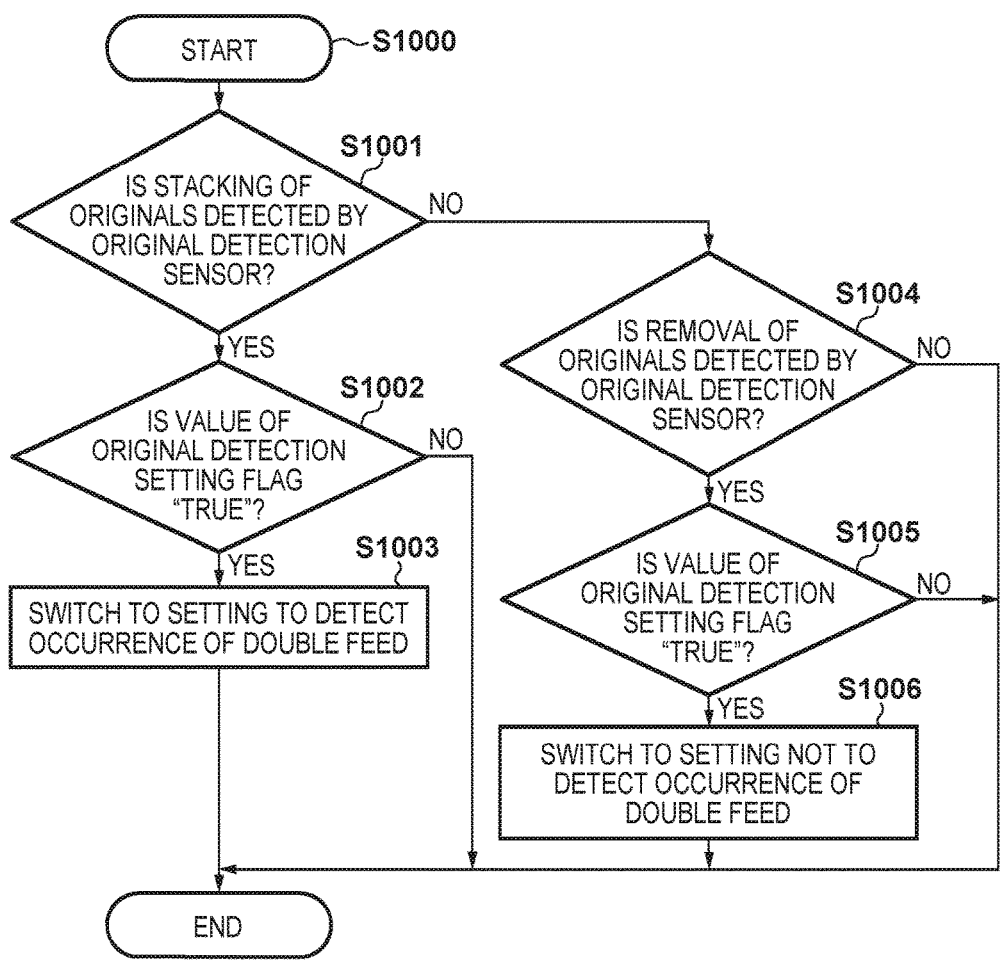
FIG. 10 is a flowchart showing a control method for controlling the execution of copying.

First of all, in step S1000 shown in FIG. 9, the CPU 111 executes a series of processing associated with switching between double feed detection settings. The processing in step S1000 will be described in detail with reference to FIG. 10.

In step S1001, the CPU 111 determines whether the original detection sensor 145 has detected the stacking of originals. If the CPU 111 determines that the original detection sensor 145 has detected the stacking of originals (YES in step S1001), the process advances to step S1002. If the CPU 111 determines NO in step S1001, the process advances to step S1004.

In step S1002, the CPU 111 refers to the value of the original detection setting flag set on the setting change screens 604 and 607 to determine whether the value is "TRUE". If the value is "TRUE", the process advances to step S1003. If the value is "FALSE", the CPU 111 advances the process to step S901 while maintaining the value of the original detection setting flag.

In step S1003, the CPU 111 switches to the setting to detect the occurrence of double feed and advances the process to step S901. More specifically, when the user stacks the originals 203 on the stacking unit 202 while the copy setting screen 701 is displayed on the panel 401, the CPU 111 displays the copy setting screen 703 on the panel 401. The copy setting screen 703 exemplifies a case in which a setting is made to detect the occurrence of double feed as indicated by the double feed detection key 704. In this case, the CPU 111 functions as a display control means.

In step S1004, the CPU 111 determines whether the original detection sensor 145 has detected the removal of an original. If the CPU 111 determines that the original detection sensor 145 has detected the removal of an original (YES in step S1004), the process advances to step S1005. In contrast, if the CPU 111 determines NO in step S1004, the process advances to step S901.

In step S1005, the CPU 111 refers to the value of the original detection setting flag set on the setting change screens 604 and 607 to determine whether the value is "TRUE". If the value is "TRUE", the process advances to step S1006. If the value is "FALSE", the CPU 111 advances the process to step S901.

In step S1006, the CPU 111 switches to the setting not to detect the occurrence of double feed, and advances the process to step S901. More specifically, when the user removes the originals 203 from the stacking unit 202 while the copy setting screen 703 is displayed on the panel 401, the CPU 111 displays the copy setting screen 705. The copy setting screen 705 exemplifies a case in which a setting is made to detect the occurrence of double feed as indicated by the double feed detection key 706.

Referring back to FIG. 9, the CPU 111 determines in step S901 whether a copy job execution instruction has been received. If the CPU 111 determines that a copy job execution instruction has been received (YES in step S901), the process advances to step S902. If the CPU 111 determines NO in step S901, the process returns to step S1000. More specifically, when the user presses the start key 412 while the copy setting screen 801 is displayed on the panel 401, a copy job execution instruction is received. In addition, if a copy job execution instruction is received, the CPU 111 displays the copy setting screen 803 on the panel 401.

In step S902, the CPU 111 sets the value of a flag (to be referred to as a scan end flag hereinafter) for indicating whether a series of processing associated with reading (scanning) of an image on the original 203 is normally ended to "FALSE" (initialization). Note that the value of the scan end flag is temporarily stored in the RAM 113. If the scan end flag is "TRUE", it indicates that scanning is normally ended. If the scan end flag is "FALSE", it indicates that scanning is not normally ended. For example, when a scan stop instruction is received or the execution of the copy job is canceled, the CPU 111 determines that scanning is not properly ended, and should not rewrite the value of the scan end flag from "FALSE" to "TRUE".

Upon execution of the processing in step S902, the CPU 111 advances the process to the scan processing in step S1100. In step S1100, the CPU 111 executes a series of processing associated with scanning. A series of processing (step S1100) associated with scanning will be described in detail below with reference to FIG. 11.

In step S1101, the CPU 111 controls the reading unit 118 to convey the original 203 stacked on the stacking unit 202. In step S1102, the CPU 111 controls the reading unit 118 to generate data by reading the original 203 conveyed in step S1101 when it passes on the original glass 212.

In step S1103, the CPU 111 controls the reading unit 118 to cause the image processing unit 142 to convert the data read in step S1102 into image data. The CPU 111 controls the reading unit 118 to temporarily store the converted image data in the RAM 113. In step S1104, the CPU 111 obtains an output value from the double feed detection sensor 149 and determines whether double feed of the originals conveyed in step S1101 has occurred. If the double feed detection sensor 149 has detected double feed, the process advances to step S1109. Otherwise, the process advances to step S1105.

In step S1105, the CPU 111 controls the reading unit 118 to determine whether reading of the original is complete. More specifically, when the trailing end of the original is detected by the conveyance sensor 146 and the reading processing and the processing of conversion to image data are complete, the CPU 111 determines that the original reading operation is complete. The process then advances to step S1106. In contrast to this, when the original is being conveyed or the processing of conversion to image data being performed, the CPU 111 determines that the reading of the original is not complete, and the process returns to step S1102.

In step S1106, the CPU 111 saves, in the storage 114, the image data temporarily stored in the RAM 113 in step S1103. In step S1107, the CPU 111 determines whether any original is placed on the original feed tray. More specifically, the CPU 111 controls the reading unit 118 to obtain an output value from the original detection sensor 145. The CPU 111 determines, based on the obtained value, whether the original 203 is stacked on the stacking unit 202. If the CPU 111 determines that the original 203 is placed on the stacking unit 202, the process returns to step S1101 to read the next original. If the CPU 111 determines that no original 203 is stacked on the stacking unit 202, the process advances to step S1108. In step S1108, the CPU 111 rewrites the value of the scan end flag stored in the RAM 113 to "TRUE", and advances the process to step S903 in FIG. 9.

Processing to be performed upon occurrence of double feed (YES in step S1104) will be described next. In step S1109, the CPU 111 determines whether a setting is made to detect the occurrence of double feed. If a setting is made to detect the occurrence of double feed, the process advances to step S1110. If a setting is made not to detect the occurrence of double feed, the process advances to step S1105. In step S1110, the CPU 111 controls the reading unit 118 to interrupt scanning. Upon interruption of scanning, the CPU 111 stops the conveyance of the original 203 or reading of an image on the original 203, and the process advances to step S1111.

In step S1111, the CPU 111 deletes image data temporarily stored in the RAM 113 in step S1103, and the process advances to step S1112. In step S1112, the CPU 111 displays the guide screen 804 on the panel 401. The process then advances to step S1113. In step S1113, the CPU 111 determines whether the recovery of an error is complete. More specifically, the CPU 111 controls the reading unit 118 to obtain output values from the plurality of conveyance sensors 146. Upon determining, based on the obtained values, that all the conveyance sensors 146 have detected no original, the CPU 111 determines that the recovery is complete. The process then advances to step S1114. If the CPU 111 determines that any of the conveyance sensors 146 has detected an original, the process returns to step S1112.

In step S1114, the CPU 111 displays the re-read standby screen 806 on the panel 401. The process then advances to step S1115. In step S1115, the CPU 111 determines whether a scan stop instruction has been received. More specifically, when the user presses the stop key 808, the process advances to step S1117. If the user does not press the stop key 808, the process advances to step S1116.

In step S1117, the CPU 111 sets the value of a flag (to be referred to as a scan restart flag hereinafter) for indicating whether to restart reading (scanning) an image on the original 203 to "FALSE". The process then advances to step S1119. Note that the scan restart flag is a flag temporarily stored in the RAM 113.

If the CPU 111 determines in step S1116 that the start key 412 is pressed, the process advances to step S1118. If the start key 412 is not pressed, the process returns to step S1115 to wait for the pressing of the key. In step S1118, the CPU 111 sets the value of the scan restart flag to "TRUE", and the process advances to step S1119. In step S1119, the CPU 111 refers to the value of the scan restart flag. If the value is "FALSE", the process advances to step S903 in FIG. 9. In addition, in this case, the CPU 111 closes the re-read standby screen 806, and switches the screen displayed on the panel 401 to the copy execution screen 809.

If the value is "TRUE", the process returns to step S1101 to perform reading processing for the original 203 placed again by the user. In addition, in this case, the CPU 111 closes the re-read standby screen 806, and switches the screen displayed on the panel 401 to the copy execution screen 809. Note that in the processing in step S1119, if an instruction to stop scanning is issued, the CPU 111 terminates the scanning processing while setting the scan end flag to "FALSE".

Referring back to FIG. 9, in step S903, the CPU 111 refers to the value of the scan end flag to determine whether the value is "TRUE". If the value is "TRUE", the process advances to print processing in step S904. If the value of the scan end flag is "FALSE", the process skips step S904 and advances to step S905.

In step S904, the CPU 111 transfers, to the printing unit 120, the image data saved in the storage 114 in step S1106. In addition, the CPU 111 controls the printing unit 120 to print an image on the sheet. When the printing of the image saved in the storage 114 is complete in step S1106, the process advances to step S905. In step S905, the CPU 111 deletes the image data saved in the storage 114 in step S1106, and terminates the copy processing. In addition, in this case, the CPU 111 closes the copy execution screen 809, and switches the screen displayed on the panel 401 to the copy setting screen 810.

As has been described above, this embodiment is configured to switch the setting not to detect the occurrence of double feed to the setting to detect the occurrence of double feed in accordance with the detection of originals stacked on the stacking unit. This makes it possible to improve operability when making, for each job, a setting about whether to detect the occurrence of double feed. In addition, according to the embodiment, it is possible to make a setting about whether to switch a setting not to detect the occurrence of double feed to a setting to detect the occurrence of double feed when detecting originals stacked on the stacking unit. This makes it possible to meet the user's demand for the continuation of the conveyance of originals upon detection of double feed of the originals.

Modification

The present invention is not limited to the first embodiment described above and can be variously modified.

For example, the first embodiment has exemplified the case in which the conveyance of originals is interrupted in accordance with the detection of double feed of the originals. However, the present invention is not limited to this. For example, the CPU 111 may perform control to interrupt only an original reading operation while keeping conveying originals even when double feed of the originals is detected.

For example, although the first embodiment has exemplified the read control in the copy function, the present invention can also be applied to functions other than the function of reading originals. More specifically, the present invention can also be applied to a file transmission function of transmitting the data of an original scanned by the MFP 101 to an information processing apparatus. In addition, the present invention can be applied to a file save function of saving the data of an original scanned by the MFP 101 in a save area in the MFP 101 and a file save function of storing the data in an external memory detachable from the MFP 101 via an external bus such as a USB.

Furthermore, the present invention can be applied to a case in which the PC 102 issues a scan instruction to a scanner having a single function to make the scanner read the original, and stores the scanned image in a save area in the PC 102. In this case, a control program (for example, a scanner driver) of the PC 102 operates in cooperation with a read control program of the scanner with the single function to perform the above control. Assume that the scanner with the single function has an arrangement, of the arrangements described with reference to FIGS. 1 to 3, which is necessary to read an original and exchange data with the PC 102. Note however that the shape and outer appearance of the convey path for conveying and reading originals can be changed as needed. As described above, the present invention can also be applied to an image reading apparatus which can detect double feed of originals and a system including the image reading apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155394 filed on Aug. 5, 2015, which is hereby incorporated by reference herein in its entirety.

What is claimed is:

1. An image reading apparatus comprising:
an original stacking tray;
a first sensor that detects an original placed on the original stacking tray;
a feeder that feeds the original;
a reader that reads the original fed by the feeder;
a second sensor that detects multi feed of originals;
an interface that receives a setting about whether to enable or to disable a function of multi feed detection which the second sensor detects the multi feed of originals; and
a display that displays an object indicating the setting of the function of multi feed detection in accordance with the first sensor detecting the original placed on the original stacking tray.

2. The apparatus according to claim 1, wherein
in a case where the setting is made to enable to the function, the display displays the object indicating that the function of multi feed detection is enabled in accordance with the first sensor detecting originals placed on the original stacking tray.

3. The apparatus according to claim 2, wherein
the display emphatically displays the object indicating that the function of multi feed detection is enabled.

4. The apparatus according to claim 2, further comprising:
a conveyer that conveys originals placed on the original stacking tray, wherein
in a case where the display displays the object indicating that the function of multi feed detection is enabled, the conveyer interrupts conveyance of originals in accordance with the second sensor detecting the multi feed of originals conveyed by the conveyer.

5. The apparatus according to claim 4, wherein
the display displays a screen for eliminating jam caused by multi feed of originals in accordance with the second sensor detecting the multi feed of originals.

6. The apparatus according to claim 5, wherein
the display displays a screen for receiving an instruction to disable the function of multi feed detection in resumed conveyance of originals in a case where eliminated conveyance of originals is resumed in accordance with an elimination of the jam caused by the multi feed of originals.

7. The apparatus according to claim 5, wherein
the display displays a screen for receiving an instruction to resume the interrupted conveyance of originals in accordance with an elimination of the jam caused by the multi feed of originals.

8. The apparatus according to claim 1, wherein
the display displays an object indicating the function of multi feed detection before originals is placed on the original stacking tray.

9. The apparatus according to claim 8, wherein
in a case where the setting is made to enable to the function, the display changes a displaying from the object indicating the function of multi feed detection to an object indicating that the function of multi feed detection is enabled, in accordance with the first sensor detecting originals placed on the original stacking tray.

10. The apparatus according to claim 8, wherein
in a case where the setting is made to disable to the function, the display does not change a displaying of the object indicating the function of multi feed detection, in accordance with the first sensor detecting originals placed on the original stacking tray.

11. The apparatus according to claim 10, wherein
the feeder continues feeding of originals even if the second sensor has detected the multi feed of originals conveyed by the conveyer in a case where the displaying of the object indicating the function of multi feed detection is not changed even if the first sensor has detected that originals is placed on the original stacking tray.

12. The apparatus according to claim 1, wherein the interface receives, from a user, an instruction for changing a displaying of an object indicating the setting of the function of multi feed detection, wherein
the displaying of the object indicating the function of multi feed detection can be changed in accordance with a reception of the instruction.

13. The apparatus according to claim 1, wherein
the display displays a reception screen for receiving, from a user, the setting about whether to enable or to disable the function, and
the reception screen is different from a screen including an object indicating the setting of the function of multi feed detection.

14. A method for controlling an image reading apparatus which comprises an original stacking tray, a first sensor that detects an original placed on the original stacking tray, a feeder that feeds the original, a reader that reads the original fed by the feeder, and a second sensor that detects multi feed of originals, wherein the method comprises:
receiving a setting about whether to enable or to disable a function of multi feed detection which the second sensor detects the multi feed of originals; and
displaying an object indicating the setting of the function of multi feed detection in accordance with the first sensor detecting the original placed on the original stacking tray.

15. A non-transitory computer-readable storage medium storing a computer program for causing a computer to execute a method for controlling an image reading apparatus which comprises an original stacking tray, a first sensor that detects an original placed on the original stacking tray, a feeder that feeds the original, a reader that reads the original fed by the feeder, and a second sensor that detects multi feed of originals, wherein the method comprises:

receiving a setting about whether to enable or to disable a function of multi feed detection which the second sensor detects the multi feed of originals; and displaying an object indicating the setting of the function of multi feed detection in accordance with the first sensor detecting the original placed on the original stacking tray.

\* \* \* \* \*